(12) United States Patent
Aosaki et al.

(10) Patent No.: US 6,963,359 B1
(45) Date of Patent: Nov. 8, 2005

(54) ELECTRONIC STILL CAMERA, INSTANT PRINTER AND INSTANT FILM

(75) Inventors: Ko Aosaki, Saitama (JP); Hiroshi Omura, Saitama (JP); Hiroyuki Uchiyama, Saitama (JP); Yoshikuni Nishiura, Tokyo (JP); Toshita Hara, Tokyo (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/529,443

(22) PCT Filed: Oct. 2, 1998

(86) PCT No.: PCT/JP98/04778

§ 371 (c)(1),
(2), (4) Date: Apr. 13, 2000

(87) PCT Pub. No.: WO99/21055

PCT Pub. Date: Apr. 29, 1999

(30) Foreign Application Priority Data

| Oct. 23, 1997 | (JP) | ................................. 9/291058 |
| Mar. 16, 1998 | (JP) | ............................... 10/065872 |
| Sep. 10, 1998 | (JP) | ............................... 10/256868 |

(51) Int. Cl.[7] ........................ H04N 5/225; H04N 5/222
(52) U.S. Cl. ............................. 348/207.2; 348/333.01
(58) Field of Search ......................... 348/207.2, 220.1, 348/333.01; 347/225, 228, 229, 234, 236–238, 347/246–248

(56) References Cited

U.S. PATENT DOCUMENTS 4,020,499 A    4/1977   Vroom

| 4,525,729 A | * | 6/1985 | Agulnek et al. ............. 347/237 |
| 4,809,020 A | * | 2/1989 | Agulnek ...................... 347/232 |
| 4,937,676 A | * | 6/1990 | Finelli et al. ................ 348/375 |
| 5,373,347 A | * | 12/1994 | Shaklee et al. ............... 355/20 |

(Continued)

FOREIGN PATENT DOCUMENTS

JP    59-219737    12/1984

(Continued)

OTHER PUBLICATIONS

Enlgish Language Translation of JP H05-019383A.*

*Primary Examiner*—Wendy R. Garber
*Assistant Examiner*—Timothy J Henn
(74) *Attorney, Agent, or Firm*—Young & Thompson

(57) ABSTRACT

Image data obtained through an image sensor is written in a memory. When printing an image, a printing head is driven in accordance with the image data read out from the memory in a line sequential fashion, and is synchronously moved in a sub scan direction, thereby exposing the instant film line by line. The image appears on the exposed instant film as a developing solution is developed by developing rollers while the instant film is advanced out through the developing rollers. Alternatively, the printing head is driven synchronously with the instant film being advanced. Thereby an image is printed at one sub scanning without the need for moving the printing head. The printing head is provided with an array of three color light emitting elements, and three color light beams are simultaneously projected onto the instant film. The electronic still camera is automatically set in an imaging mode when a power switch is turned on, and is switched to a display mode or a print mode as soon as a display mode key or a print mode key is operated. After being switched to the display mode, the electronic still camera is quickly switched to the imaging mode if only a shutter release button is operated.

19 Claims, 24 Drawing Sheets

U.S. PATENT DOCUMENTS 5,802,413 A * 9/1998 Stephenson ................. 396/429
5,828,406 A * 10/1998 Parulski et al. ........... 348/220.1
5,835,136 A * 11/1998 Watanabe et al. ......... 348/231.9
5,946,031 A * 8/1999 Douglas ................ 348/207.99
6,229,565 B1 * 5/2001 Bobry ................... 348/207.99

FOREIGN PATENT DOCUMENTS

| | | | | |
|---|---|---|---|---|
| JP | 1-137245 | 5/1989 | | |
| JP | 2-287527 | 11/1990 | | |
| JP | 2-301734 | 12/1990 | | |
| JP | 2-301736 | 12/1990 | | |
| JP | 3-271730 | 12/1991 | | |
| JP | 3-282531 | 12/1991 | | |
| JP | 4-29128 | 1/1992 | | |
| JP | 4-51034 | 2/1992 | | |
| JP | 4-78843 | 3/1992 | | |
| JP | 4-212943 | 8/1992 | | |
| JP | 5-19380 | 1/1993 | | |
| JP | 5-19383 | 1/1993 | | |
| JP | 05019383 A | * | 1/1993 | .......... G03B 27/73 |
| JP | 5-27341 | 2/1993 | | |
| JP | 6-189308 | 7/1994 | | |
| JP | 06189308 A | * | 7/1994 | ............ H04N 7/18 |
| JP | 6-309428 | 11/1994 | | |
| JP | 9-61934 | 3/1997 | | |
| JP | 9-65182 | 3/1997 | | |

* cited by examiner

FIG. 25
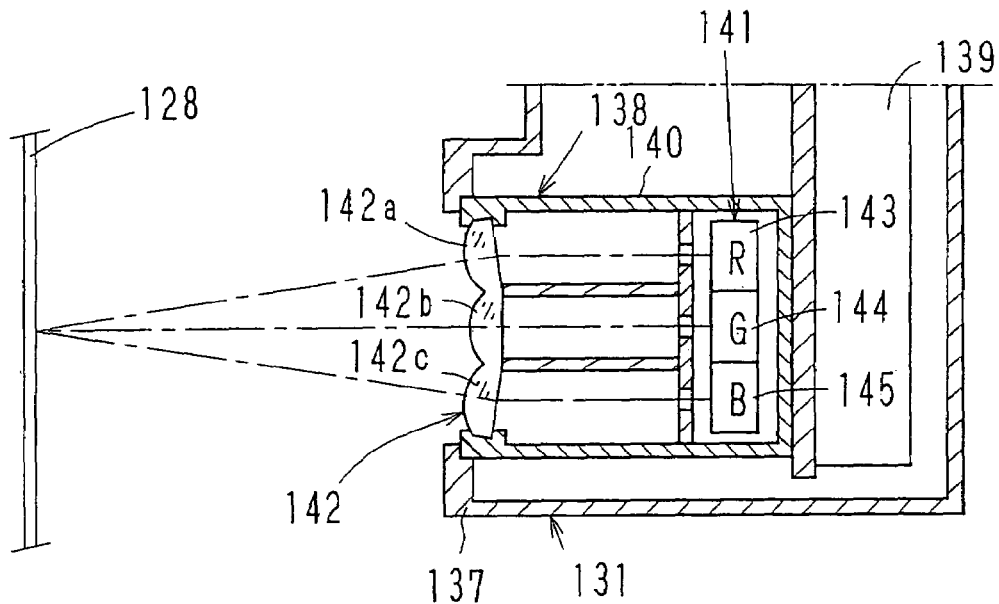
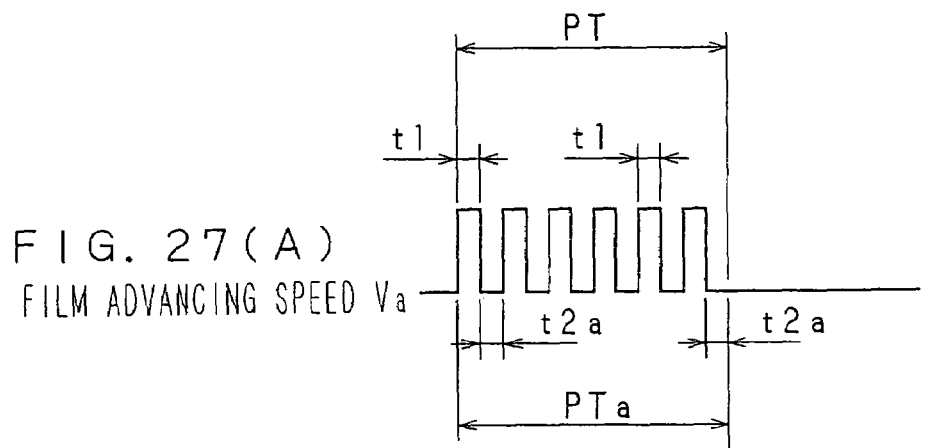
FIG. 27(A)
FILM ADVANCING SPEED Va
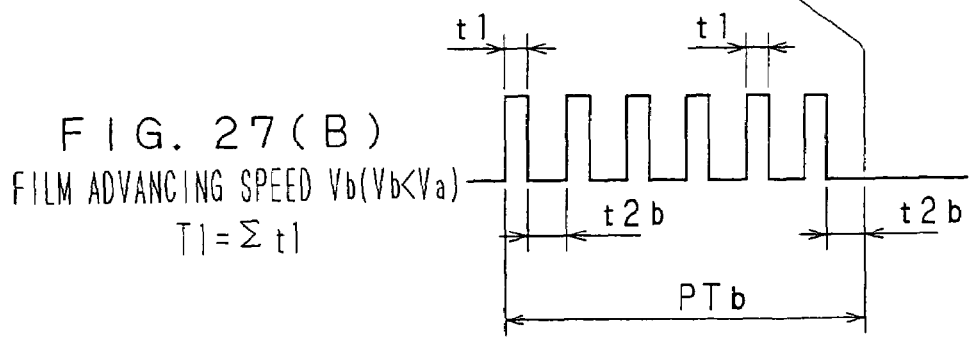
FIG. 27(B)
FILM ADVANCING SPEED Vb(Vb<Va)
T1=Σt1

ELECTRONIC STILL CAMERA, INSTANT PRINTER AND INSTANT FILM

FIELD OF THE ART

The present invention relates to an electronic still camera that photoelectrically obtains image data through an image sensor and records the image data in a memory in a digital form, and more particularly to an electronic still camera having a printer incorporated thereinto, which makes a hard copy of an image from the image data written in the memory. The present invention also relates to an instant printer that is compact and portable, or is able to be incorporated into a camera, and an instant film for use with the instant printer.

BACKGROUND ARTS

Portable electronic still cameras are widely used, which convert an optical image of a subject to an electric image signal through a CCD (charge-coupled device) image sensor or the like, convert the image signal to digital image data, and write the image data in a memory. The memory is capable of storing several tens of frames of image data, and it is possible to read out the image data therefrom for displaying or reproducing the subject image on a liquid crystal display (LCD) panel that is mounted to the camera body, or on external apparatuses such as a monitor CRT and a personal computer.

As the memory for recording the image data therein is generally used a DRAM (dynamic random access memory) which is accessible at high speed, and is usually called a flash memory. Because the flash memory is able to delete or rewrite the image data, it is easy to delete unnecessary image data from the memory or revise the memory with new image data. Using the recording medium repeatedly is a feature of the electronic still camera that is advantageous over those cameras using photographic film. In addition to the flash memory or other built-in memories like hard discs, it is possible to use a card memory or a flexible magnetic sheet that is removably attachable to the electronic still camera.

Meanwhile, video printers have made it possible to make a hard copy of an image of a subject on the basis of image data written in the flash memory or the like. The video printers include Laser printer, thermal transfer printer, ink-jet printer and so forth. To make a hard copy, the image data read out from the flash memory of the electronic still camera is directly transferred to these printers, or is written in a recording medium like a card memory or a magnetic sheet, and then read out by the printers from the recording medium.

Since the conventional video printers mainly use heat energy for printing, they consume certain amount of electric power. Besides, the printer body is so large that it is unhandy to carry about. Therefore, not being able to get a hard copy of a photographed image instantly is disadvantage to the conventional electronic still camera.

In view of the foregoing, an object of the present invention is to provide a portable electronic still camera having a printing device integrated therein that facilitates making a hard copy of a photographed image instantly.

Another object of the present invention is to provide an instant printer for printing an image on an instant film at a high speed on the basis of digital image data, that is so small and consume less electric power that it is handy to carry about or for integration into a camera.

A further object of the present invention is to provide an instant film that is convenient for use in the instant printer of the present invention.

DISCLOSURE OF THE INVENTION

An electronic still camera according to the present invention is comprised of an imaging device for obtaining electronic image data from an optical image of a subject; memory means for recording image data therein; a printing device for printing an image on an instant film containing a processing solution therein, the printing device comprising a printing head which is elongated in a main scan direction, a head moving mechanism for moving the printing head in a sub scan direction perpendicular to the main scan direction, and a head driver for driving the printing head on the basis of one frame of image data read out from the memory means in a line sequential fashion to expose the instant film line by line while the printing head is moved in the sub scan direction; and a pair of developing rollers for advancing the instant film after exposure out of a camera body while developing the processing solution inside the exposed instant film.

Using the instant film as the recording medium makes it possible to make a hard copy of an image photographed by the electronic still camera without the need for heat energy but with a low electric power. Because the printing device built in the camera scans the instant film with the printing head in a line sequential fashion while reading out the image data line by line from the memory device, the mechanical construction as well as the electrical construction of the printing device can be simple.

While conventional instant cameras consume the instant film at every shutter release operation regardless of whether the consequent photograph looks good or poor, the electronic still camera of the present invention allows to confirm the quality of the photographed image on the basis of the image data written in the memory and thereafter decide whether the photographed image is to be printed or not. Therefore, waste of instant film is avoidable.

According to the present invention, an instant printer is comprised of a film advancing device including developing rollers for developing the processing solution in an exposed instant film; a printing head located near and before the developing rollers in the film advancing direction, the printing head having an array of light emitting elements arranged in a main scan direction perpendicular to the film advancing direction; and a head driver for driving the light emitting elements in accordance with digital image data fed to the head driver in a line sequential fashion, synchronously with the film advancing device advancing the instant film, thereby to expose the instant film line by line.

Making use of the film advancing through the developing rollers for sub scanning, the printing head does not need to move in the sub scan direction. Therefore, it takes shorter time for printing, and the construction is simplified. Although the film advancing speed is likely to fluctuate in a time period while the processing solution is developed, if timing of light emission of the printing head is controlled in accordance with the film advancing speed, it is possible to reduce unexpected variations in density and color of the printed image that may be caused by the advancing speed fluctuations. By providing an instant film with a track for detecting advancing speed of the instant film, it is easy to detect the film advancing speed, and control the light emission timing in accordance with the film advancing speed.

BRIEF DESCRIPTION OF THE DRAWINGS

FIG. 25 is a sectional view of a printer head unit of the electronic still camera shown in FIG. 20;

FIGS. 27(A) and 27(B) are timing charts illustrating an operation for controlling timing of light emission in accordance with variations in film advancing speed in the electronic still camera shown in FIG. 20;

PREFERRED EMBODIMENTS OF THE INVENTION

Figure 1:
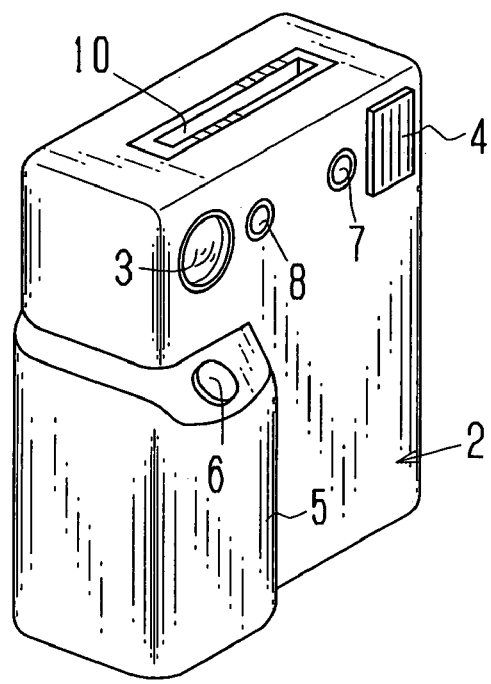
FIG. 1 is a front perspective view of an electronic still camera having an instant printer incorporated thereinto, according to a first embodiment of the invention.
Figure 2:
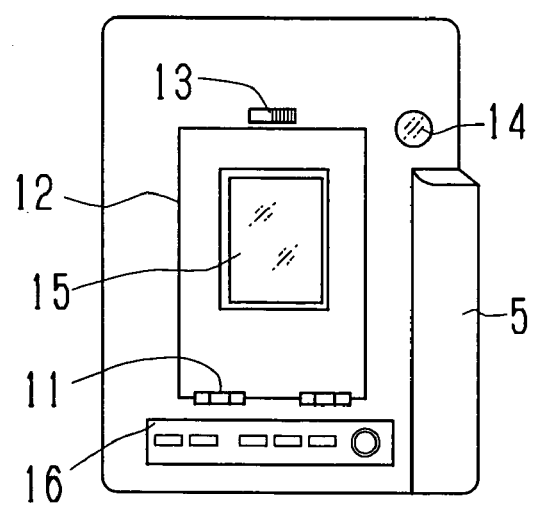
FIG. 2 is a rear side view of the electronic still camera shown in FIG. 1.

The present invention will be described in more detail with reference to the accompanying drawings. In FIGS. 1 and 2, an electronic still camera according to a first embodiment of the invention has a camera lens 3 and a flash-emitting window 4 which are formed in the upper front surface of a camera body 2. A shutter release button 6 is located on the top of a grip 5. When the shutter release button 6 is pressed, an image is taken as a photograph through the camera lens 3. On one side of the camera lens 3 are disposed a light projector window 7 and a light receiver window 8 of an auto-focussing device for measuring a subject distance of a subject to be photographed in accordance with a technique of optical triangulation. When the shutter release button 6 is pressed, focusing of the camera lens 3 is accomplished automatically prior to the photography.

There is a film exit 10 formed as a slot in a top face of the camera body 2. When printing operation is effected, an exposed instant film is ejected through the film exit 10. A pair of developing rollers are disposed in a position inwards from the film exit 10. When the exposed instant film is moved between the developing rollers, processing solution is spread. A positive image appears on the instant film after one minute to several minutes.

To produce a hard copy of an image in the electronic still camera, is used an instant film of the mono-sheet type which is well-known in the art of photography. The mono-sheet type instant film has been widely used, and mainly consists of a photosensitive sheet, an image receiving sheet and a solution pod containing processing solution. The photosensitive sheet is first exposed to create a latent image photochemically, and is tightly fitted on the image receiving sheet. The processing solution is spread between the two sheets while they are pressed to each other. Thereby a positive image is transferred to the image receiving sheet. There is a film pack constituted of a plastic case, which contains ten sheets of instant films overlaid on one another. The camera body 2 of the electronic still camera is loaded with the film pack.

As shown in FIG. 2, a pack loading door 12 is pivotally mounted to the back side of the camera body 2 through a hinge 11. The pack loading door 12 is normally locked in the closed position. A knob 13 is operated to open the pack loading door 12 for the purpose of inserting or removing the film pack. A counter window 14 indicates the number of instant films exposed. An LCD panel 15 is incorporated into the pack loading door 12. The LCD panel 15 displays an image of a photographic subject to be picked up through the camera lens 3 in a real time fashion, constituting an electronic viewfinder.

A control panel 16 is disposed below the pack loading door 12. The control panel 16 has various keys, including a mode changer key for switching between an imaging mode and a display mode, a frame selector key, a print start key, a deletion button for deleting image data, connector terminals for inputting and outputting image data with an external instrument, and a switching key for the connector terminals.

Figure 3:
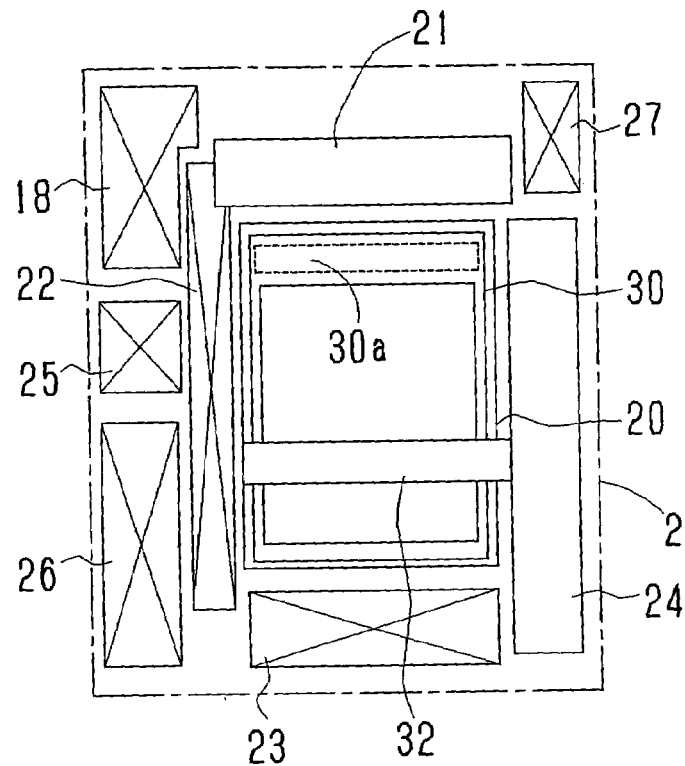
FIG. 3 is an explanatory view illustrating a layout of the interior of the electronic still camera shown in FIG. 1.

Inside the camera body 2, as shown in FIG. 3, an imaging unit 18 including a CCD image sensor is disposed behind the camera lens 3, and the developing rollers 21, a developing mechanism 22 for driving the developing rollers 21, a circuit board 23 for the control panel 16, and a head moving mechanism 24 are arranged around a chamber for loading a film pack 20 therein. Also, a developing motor 25 for activating the developing mechanism 22, a power source battery 26, e.g. a rechargeable lithium battery, and a flash device 27 are mounted.

Among those elements, the developing rollers 21 and the developing mechanism 22 may have the same construction as those used in conventional instant cameras, e.g. those disclosed in JPA 4-194832, and operate in the same way as conventional. That is, the developing rollers 21 and the developing mechanism 22 cooperate for advancing an instant film 30 out of the film pack 20 after the film 30 is exposed, while developing or spreading the processing solution inside the instant film 30.

The developing mechanism 22 includes an advance claw and a mechanism for moving the advance claw, as well-known in the art. When the developing motor 25 rotates, the advance claw is actuated to push up the bottom edge of the exposed instant film 30, until the top edge of the instant film 30 comes in between the developing rollers 21. After the instant film 30 comes in between the developing rollers 21, since the developing rollers 21 have started rotation then, the instant film 30 is moved upwards by the developing rollers 21. There is a solution pod 30a disposed along the top edge of the instant film 30 for containing processing solution. The developing rollers 21 are biased by a spring in the direction to close to each other. Thus, the solution pod 30a is broken to spread the processing solution between the photosensitive sheet and the image receiving sheet, while the instant film 30 is advanced through the developing rollers 21.

Figure 4:
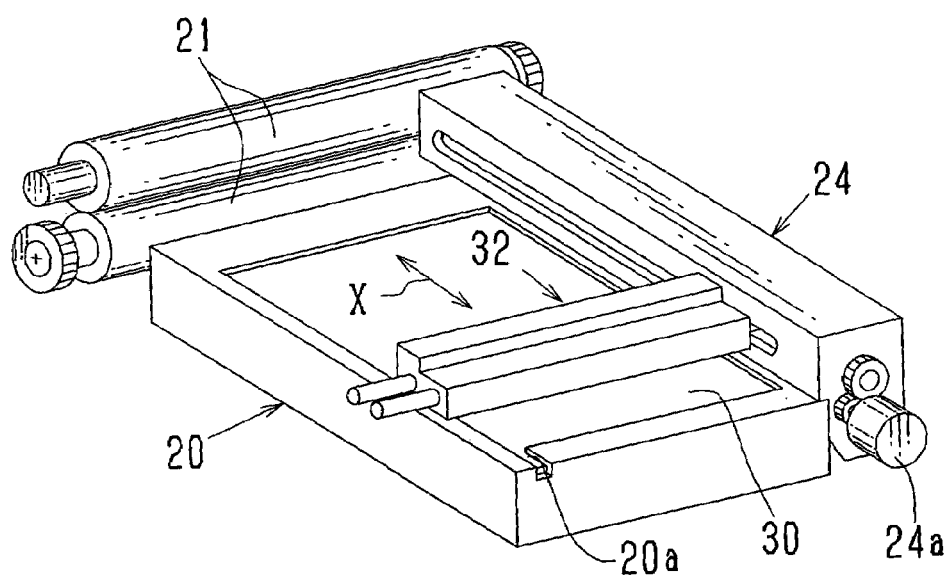
FIG. 4 is a perspective view of the instant printer incorporated into the electronic still camera shown in FIG. 1.

FIG. 4 illustrates the head moving mechanism 24 and a printing head 32, which constitute an instant printer section. A longitudinal direction of the printing head 32 is perpendicular to the advance direction of the instant film 30. The printing head 32 has a length equal to or greater than a width of the instant film 30. The head moving mechanism 24 is driven by a scanning motor 24a to shift the printing head 32 in the arrow direction X parallel to the advance direction of the instant film 30. There are a pair of guide pins disposed on either end of the printing head 32, which are engaged in guide grooves slidably, for preventing the printing head 32 from leaning during the movement. Designated by 20a is a cutout formed in the film pack 20 in a position for the advance claw to enter it when ejecting the instant film 30 from the film pack 20.

Figure 5:
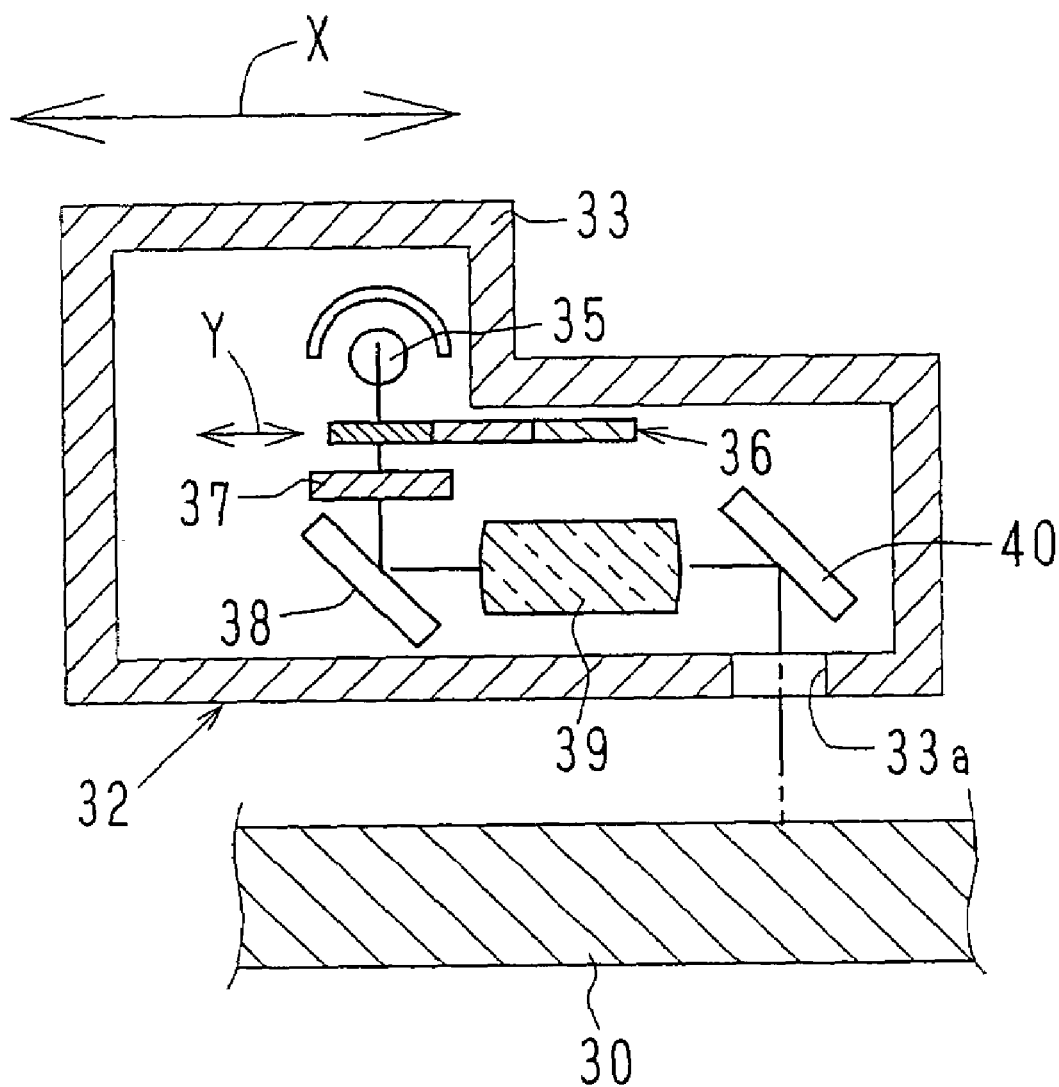
FIG. 5 is a schematic sectional view illustrating the interior of a printing head of the electronic still camera shown in FIG. 1.

FIG. 5 shows the printing head 32 as viewed in cross section. A light-tight housing 33 contains a fluorescent lamp 35 elongated in the longitudinal direction of the printing head 32. Illuminating light from the fluorescent lamp 35 includes light components of red (R), green (G) and blue (B) colors. Another kind of light source may be used insofar as it emits printing light including those three-color light components.

A color filter 36 is placed in a path of the illuminating light from the fluorescent lamp 35. The color filter 36 includes a red pass filter portion, a green pass filter portion and a blue pass filter portion, which extend like belts in the longitudinal direction of the fluorescent lamp 35 and are arranged side by side in a perpendicular direction Y to the fluorescent lamp 35. Any one of those filter portions is positioned in the illuminating light path of the fluorescent lamp 35 as the color filter 36 is moved in the direction Y in response to a filter change signal.

The illuminating light from the fluorescent lamp 35 is passed through the color filter 36 and becomes printing light of any one of red, green and blue colors. The printing light travels through an LCD array 37, a mirror 38, a micro lens array 39, and a mirror 40, and is projected through an opening 33a onto the instant film 30. The micro lens array 39 consists of an array of micro cylindrical lenses made of graded index type optical fibers, called SELFOC lens (a trade name). The LCD array 37 consists of micro LCD segments arranged in one line. Each one of the LCD segments corresponds to one pixel of printing. The LCD segments of the LCD array 37 are each individually controlled to change printing density by cutting the printing light or adjusting the transmission amount of the printing light. The micro lens array 39 prevents the printing light for each of the pixels from spreading to positions of pixels adjacent to it. There are light-shielding members suitably disposed in the housing 33 so as to let only the printing light out through the opening 33a.

Figure 6:
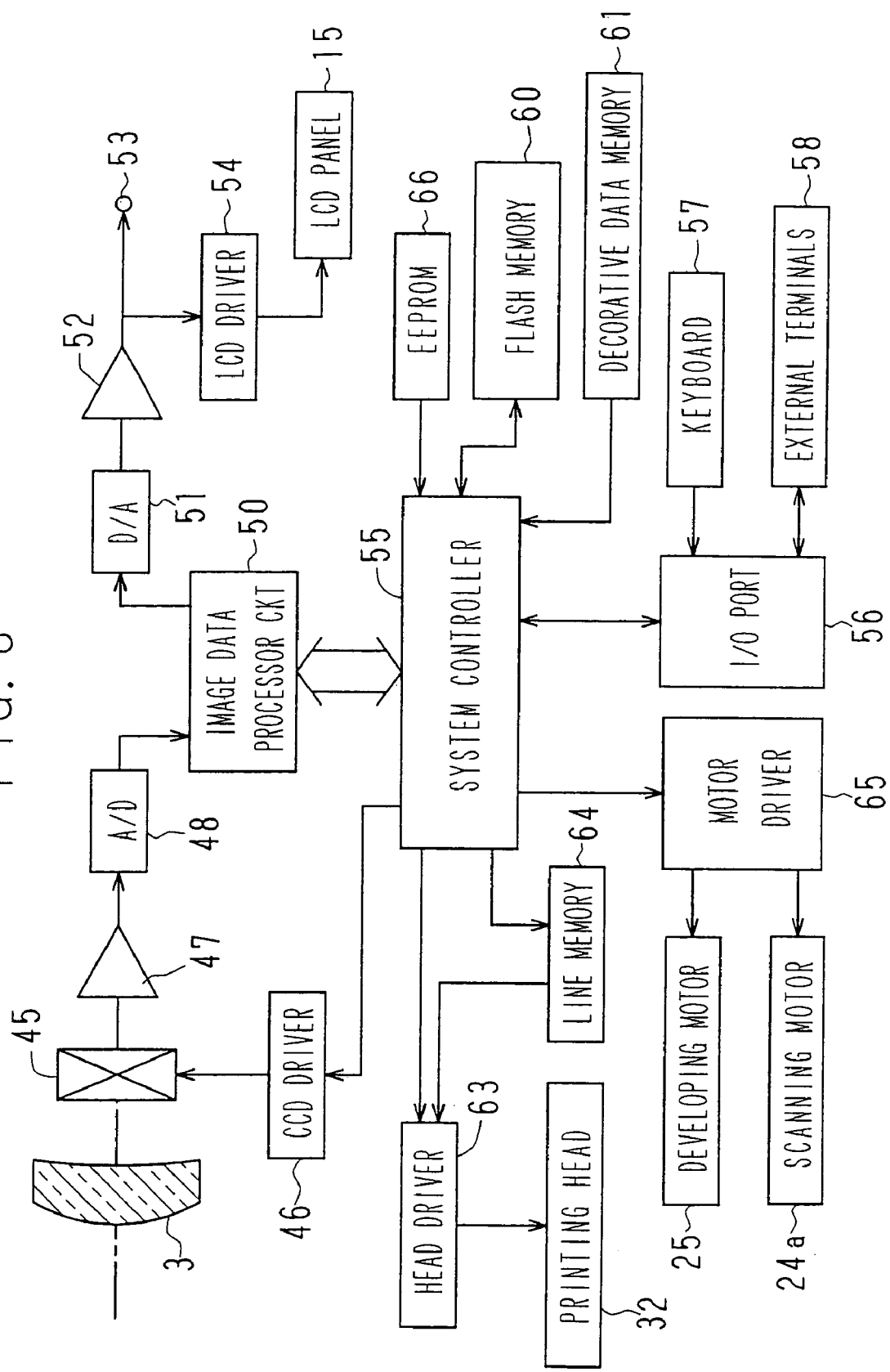
FIG. 6 is a block diagram illustrating an electric construction of the electronic still camera shown in FIG. 1.

FIG. 6 illustrates the circuitry of the electronic still camera according to the present invention. The CCD image sensor 45 is located behind the camera lens 3. When the camera lens 3 is focused, a subject image is formed on a photoelectric plane of the CCD image sensor 45. A CCD driver 46 drives the CCD image sensor 45 to convert the optical subject image photoelectrically into an electric image pick-up signal. Micro color filters of red, green and blue colors are arranged on the photoelectric plane of the CCD image sensor 45 in a matrix. The image pick-up signal is output color by color in a serial manner, and is amplified by an amplifier 47 at a suitable level, and converted by an A/D converter 48 into a digital form. It is to be noted that driving operation of the CCD driver 46 is synchronized with sampling timing of the A/D converter 48.

The A/D converter 48 produces digital image data from the image pick-up signal, and feeds the image data sequentially to an image data processor circuit 50. The image data processor circuit 50 operates for the signal processing of the supplied image data for white balance adjustment, gamma correction and the like. Moreover the image data processor circuit 50 produces a video signal corresponding to the NTSC composite signal from the processed image data. The video signal is sent through a D/A converter 51 and an amplifier 52 to an output terminal 53 for the video signal.

It is therefore possible to observe the subject image picked up by the CCD image sensor 45 in a continuous manner by connecting the output terminal 53 to a home television set. The video signal from the amplifier 52 is also fed to an LCD driver 54. As the LCD driver 54 drives the LCD panel 15 that is incorporated into the pack loading door 12, the LCD panel 15 displays the subject image in a continuous manner. Therefore the LCD panel 15 operates as the electronic viewfinder.

A system controller 55 controls the image data processor circuit 50 and all the other electric operations of the electronic still camera. The system controller 55 monitors signals from a key board 57 and a group of external terminals 58 of the control panel 16 through an I/O port 56, and operates for the signal processing in accordance with the input signals.

A flash memory 60 is constituted of a DRAM. The flash memory 60 stores the image data frame by frame after the image data is obtained by the image data processor circuit 50, and has a capacity enough to store image data of fifty frames. A decorative data memory 61 previously stores decorative data, which is used to modify the shape and pattern of framing lines around the subject image variously. The decorative data memory 61 may also store decorative data for merging cartoons, marks, letters, messages and the like into a part of the subject image. In the display mode, selected data pieces are transferred from the flash memory 60 and the decorative data memory 61 to the image data processor circuit 50, and an image composed of the image data and the decorative data read from the flash memory 60 and the decorative data memory 61 is displayed on the LCD panel 15.

A head driver 63 drives the printing head 32 under the control of the system controller 55. A line memory 64 sends the printing head 32 the image data, which is used for controlling the respective transmittance of the individual LCD segments 37. EEPROM 66 previously stores various kinds of adjustment data, which are referred to by the system controller 55 when the electronic still camera is operated according to a predetermined sequence.

The adjustment data is fine-adjusted to each individual camera in an inspection process after the finish of assembly of the electronic still camera. The adjustment data includes data related to focussing the camera lens 3, and respective compensation data for the three colors adapted to printing. A motor driver 65 drives the developing motor 25 and the scanning motor 24a under the control of the system controller 55.

Figure 7:
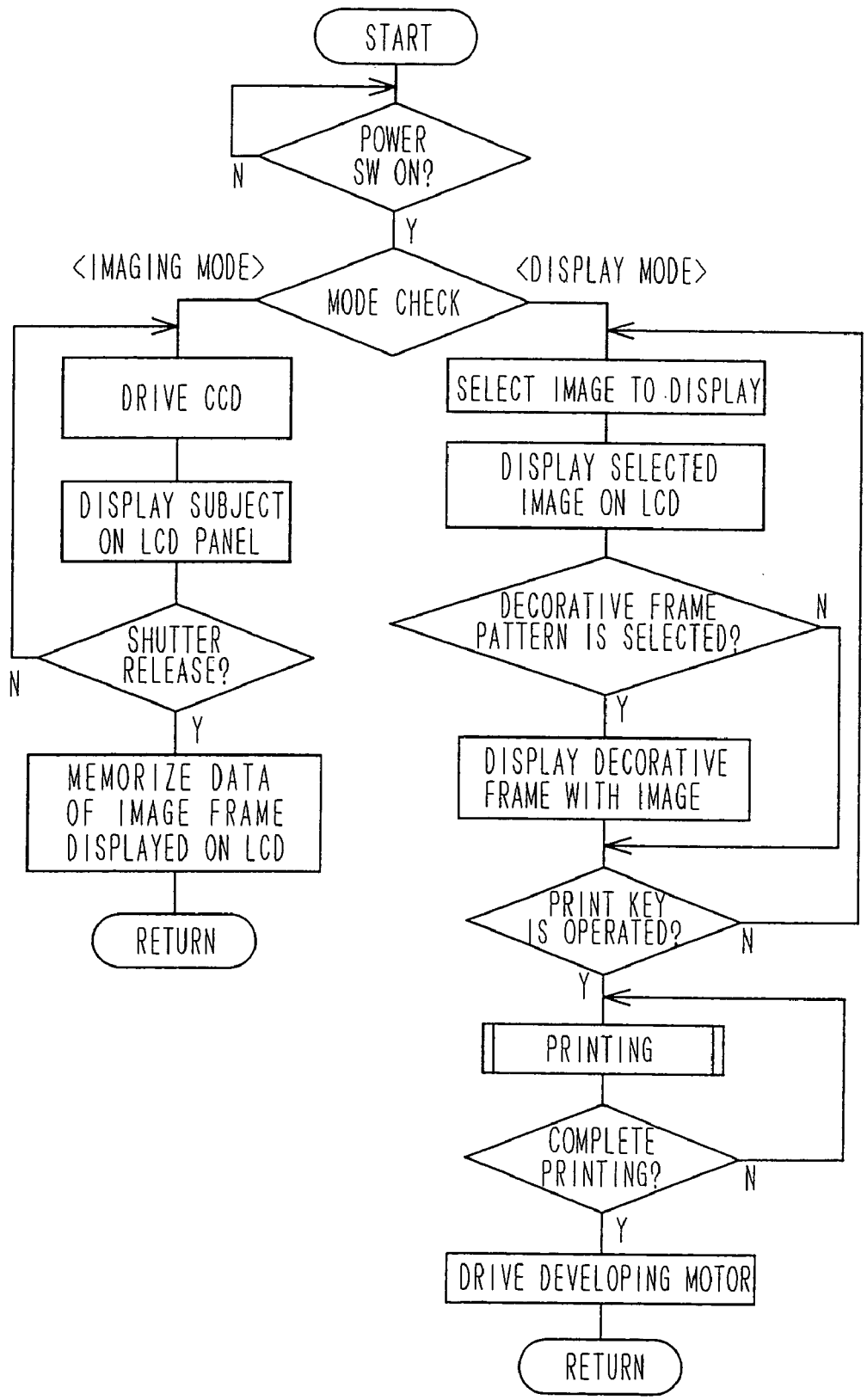
FIG. 7 is a flow chart illustrating the overall operation of the electronic still camera shown in FIG. 1.

The operation of the electronic still camera having the above-described construction will be described with reference to FIG. 7. When a power switch, which is provided on the control panel 16, is turned on, the system controller 55 determines the presently selected mode by a set position of the mode changer key in the control panel 16, and proceeds to either one of the imaging mode and the display mode. In the imaging mode, the CCD image sensor 45 picks up the subject image in a continuous manner, so the subject image is displayed as a moving image on the LCD panel 15 serving as the electronic viewfinder.

When the shutter release button 6 is pressed, the image data of the subject image displayed at that moment on the LCD panel 15 is written as a still image frame to the flash memory 60. By repeating the shutter release operation in the imaging mode, it is possible to write image data of at most fifty still image frames to the flash memory 60. The maximum number of frames the flash memory 60 can store varies depending upon the capacity of the flash memory 60.

After the image data of the maximum number of frames is written in the flash memory 60, it is possible to delete image data of unnecessary frames from the flash memory 60 and write newly obtained image data to the flash memory 60. These operation are effected by keying the control panel 16. It is also possible to write newly obtained image data in an external memory medium or transfer the image data from the flash memory 60 to the external memory medium by connecting the external memory medium to an output terminal of the external terminals 58.

In the display mode, a desired frame is designated by keying through the control panel 16. The image data of the designated frame is sent from the flash memory 60 to the image data processor circuit 50, converted by the D/A converter 51, amplified by the amplifier 52 and supplied to the LCD driver 54, which causes the LCD panel 15 to display an image of the designated frame. If a decorative frame pattern is designated by keying through the control panel 16, the decorative frame pattern data is transferred from the decorative data memory 61 to the image data processor circuit 50 in addition to the image data read transferred from the flash memory 60. Then, the LCD panel 15 displays a composed image of the subject image with the decorative frame image.

When a print key is operated after selecting the subject image and, if necessary, a decorative frame pattern, the system controller 55 accesses the flash memory 60, to sequentially read out red-color image data of a first line from among the image data of the subject image presently displayed on the LCD panel 15. The red-color image data of the first line represent densities of red pixels of the first line, and is transferred to the line memory 64. If a decorative frame pattern is designated, red-color image data of a first line is read out from the image data of the decorative frame pattern stored in the decorative data memory 61, and is transferred to the line memory 64. In those pixels where the image data from the decorative data memory 61 overlaps with the image data from the flash memory 60, the former is used with priority over the latter. In this way, the line memory 64 comes to store the red-color image data of the first line. The system controller 55 confirms that the red pass filter portion of the color filter 36 is inserted into the printing light path and that all the LCD segments 37 are their light-shielding state. Then the system controller 55 turns on the fluorescent lamp 35.

The printing head 32 is in an initial position confronted with the bottom edge of the instant film 30. The initial position is a position to start recording the first line. The system controller 55 confirms that the printing head 32 is in the initial position by use of a photo sensor (not shown). Then the image data of the first line is sent from the line memory 64 sequentially to the LCD array 37, so the respective transmittance densities of the LCD segments are set at values corresponding to the image data. In a predetermined time, the LCD segments are reset to the light-shielding state.

The red printing light from the red pass filter portion of the color filter 36 travels through the LCD segments, so the instant film 30 is exposed to the red printing light of different amounts determined by the transmittance densities of the respective LCD segments. It is to be noted that it will take a shorter time to print one line when the image data of one line is concurrently transferred from the line memory 64 to the respective LCD segments of the LCD array 37, and the LCD segments are concurrently switched to have such transmittance densities that are determined by the image data.

At the conclusion of the one-line exposure to the red printing light, the scanning motor 24a, which is a stepping motor, rotates through a predetermined angle, shifting the printing head 32 to a position of a succeeding line. Thereafter, red-color image data representative of densities of red pixels of the second line is transferred from the flash memory 60 to the line memory 64. The second line is exposed to the red printing light in a similar manner to the first line. The printing head 32 is shifted toward the developing rollers 21 in a stepwise manner, while each line is exposed to the red printing light. When a final line has been exposed to the red printing light, printing 1 of red pixels of one frame is completed.

Then the system controller 55 sends the head driver 63 a filter change signal, to slide the color filter 36 in the direction Y by an amount to position the green pass filter portion in the printing light path. The system controller 55 accesses the flash memory 60, serially reads out green-color image data representative of green pixels of the final line from among the image data of the subject image to be printed, and transfers the green-color image data to the line memory 64.

Thereafter, the instant film 30 is exposed to the green printing light in the same way as above, but in the direction from the final line to the first line. After the completion of printing the green pixels of one frame, the blue pass filter portion is inserted in the printing light path, while blue-color image data representative of blue pixels of the subject image is read line by line from the flash memory 60. Thus, each line is exposed to the blue printing light. After the exposure with the three-color printing light is completed, the printing head 32 is placed in a retreat position as shown in FIG. 4, which is shifted toward the developing rollers 21 from the initial position.

After the printing head 32 moves in the retreat position, the developing motor 25 starts actuating the developing mechanism 22 in response to a signal from the system controller 55, to move the advance claw into the cutout 20*a* of the film pack 20. The advance claw pushes the exposed one of the instant films 30 out of the film pack 20. The printing head 32 in the retreat position does not interfere with the advance claw being moved.

As the instant film 30 is pushed by the advance claw, the top edge of the instant film 30 comes in between the developing rollers 21. Thereafter, the developing rollers 21 rotate to advance the instant film 30 and, at the same time, break the solution pod 30*a* to spread the processing solution. The advance claw makes one stroke of reciprocation, and then stops at its home position. Upon the advance claw returning to its home position, the scanning motor 24*a* is driven to move the printing head 32 to its initial position.

The instant film 30 between the developing rollers 21 is ejected through the film exit 10 at the top of the camera body 2. In one or a couple of minutes, the subject image is fixed as a positive image on the image receiving sheet, providing a hard copy of the subject image displayed on the LCD panel 15 at the time of operating the print key. If a decorative frame pattern is designated, the subject image as printed is surrounded with the decorative frame pattern.

As described so far, since the instant printer using the instant film 30 as a recording medium is incorporated into the electronic still camera, a hard copy of a full-color image picked up by the electric camera is made at low electric power without the need for heat energy. Such small capacity batteries that are containable in the camera body 2 are enough as a power source for the instant printer. Consequently, a hard copy of a subject image may be made easily as soon as the image is picked up through the electronic still camera. It is also possible to input image data of an image through the external terminals to the electronic still camera, and make a hard copy of that image through the instant printer. Therefore, the electronic still camera of the present invention is usable as a portable printer.

The electronic still camera according to the present invention has three usages: an electronic still camera for photographing a subject, an image display device for observing the photographed image, and a printer for making a hard copy based on image data from an internal memory or an external memory. In order to make good use of the respective functions of this type of electronic still camera without confusions, it is necessary to put operation procedures in systematical order, as well as to design the camera so as to prevent wrong operations. The following embodiment relates to an electronic still camera provided with an imaging function, a displaying function, and a printing function, which is easy to operate and works precisely.

Figure 8:
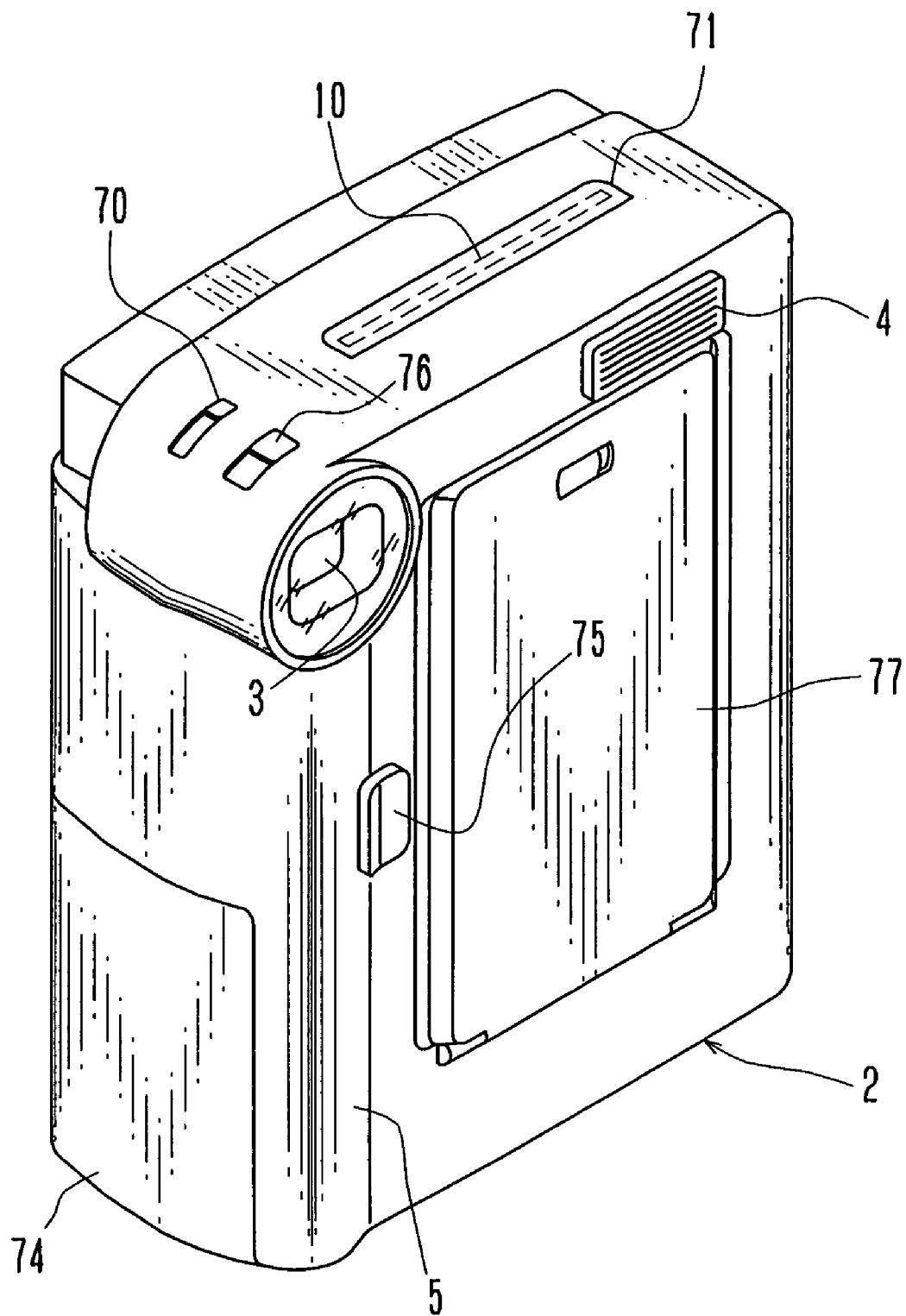
FIG. 8 is a front perspective view of an electronic still camera having an instant printer incorporated thereinto, according to a second embodiment of the invention.

FIG. 8 shows a front view of an electronic still camera according to a second embodiment of the invention. A power switch 70 is located at an upper portion of a camera body 2. When the power switch 70 is turned on, various operation keys are made effective, and the electronic still camera automatically proceeds to an imaging mode for picking up subject images. A camera lens 3 and a flash window 4 are located at upper front portions. A grip portion 5 is provided with a battery chamber lid 74 on its side area, which is opened for exchanging a power source batteries. For example, the power source batteries are four pieces of AA size batteries connected in series.

A shutter release button 75 is located at a front area of the grip portion 5. Upon the shutter release button 75 being pressed, a still image frame of the subject formed through the camera lens 3 is recorded. As the camera lens 4 is used a pan-focus lens whose depth of field ranges, for example, from 1.2 m to infinity. Therefore focusing is not fundamentally necessary. For enabling a close-up photography at a subject distance of less than 1 m, a close-up setting knob 76 is provided. It is possible to provide a well-known automatic focusing device using the optical triangulation or a method of detecting peaks of spatial frequency, so that the camera lens 3 is automatically focused in response to a half depression of the shutter release button 75 within a standard object distance.

In the same way as the first embodiment, the electronic still camera uses mono-sheet type instant films for producing hard copies of the recorded image frames. A slit-like film exit 10 is formed through a top face of the camera body 2. The film exit 10 is usually covered with a door 71 in a light-tight fashion. A pair of developing rollers are provided inside the film exit 10. When a printing operation is made, an exposed instant film is advanced through the developing rollers, and protrudes out through the film exit 10. Then the instant film is ejected from the camera body 2 while pushing out the door 71. Simultaneously, processing solution is developed to form a positive image on the instant film in a minute or so.

To load a film pack, a pack loading door 77 is provided on a front face of the camera body 2. In its closed position, the pack loading door 77 is stepped forward from the front wall of the camera body 2. The front surface of the pack loading door 77 is even with the front surface of the grip portion 5, the front end of the camera lens 3 and the front surface of the flash window 4, so that the camera body 2 is laid stably with its front side down.

Figure 9:
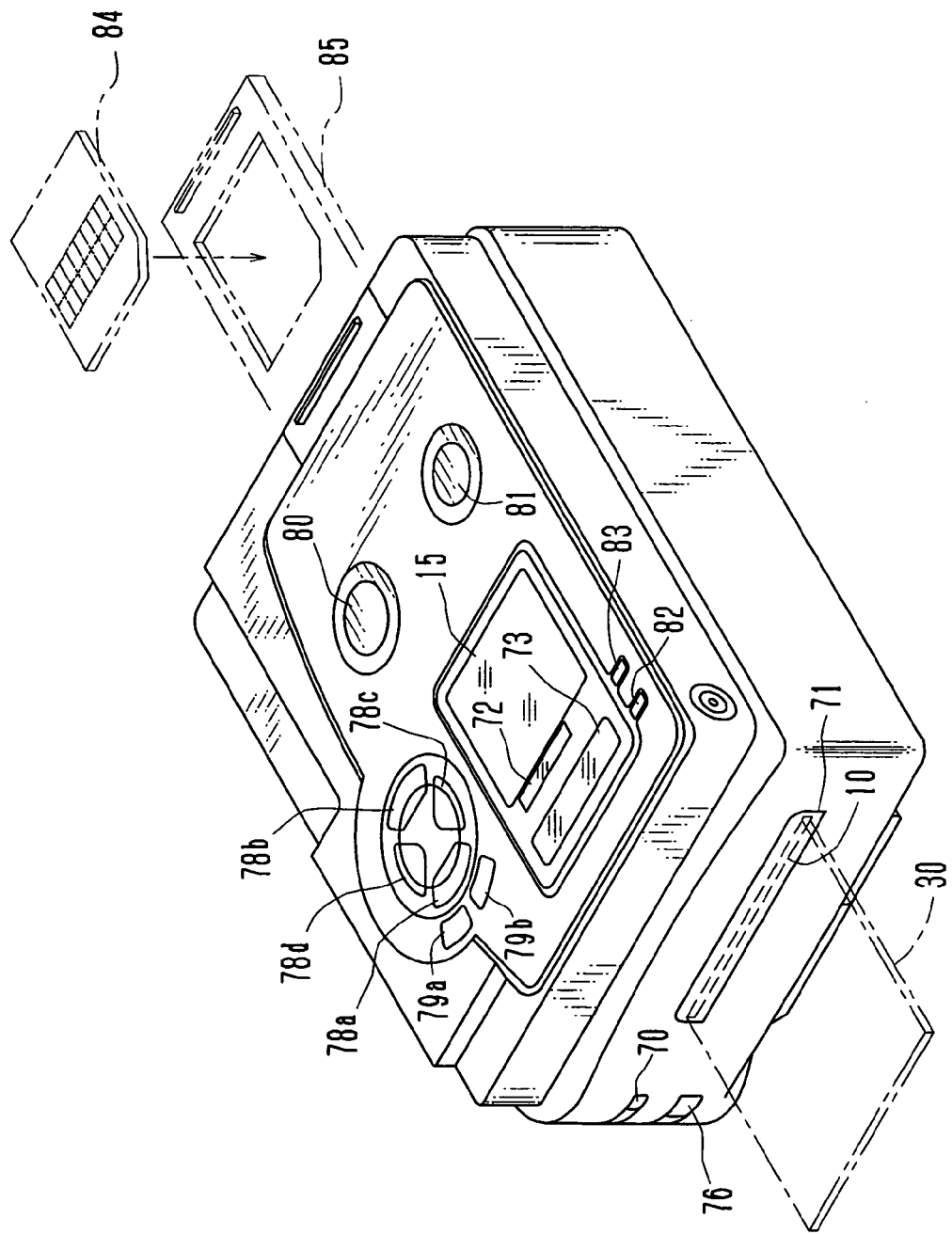
FIG. 9 is a rear perspective view of the electronic still camera shown in FIG. 8.

As shown in FIG. 9, the rear side of the camera body 2 is provided with an LCD panel 15 that constitutes an electronic viewfinder for displaying a full-color subject image picked up through the camera lens 3 in a real time fashion. The LCD panel 15 is constituted of a white light fluorescent lamp, liquid crystal segments and micro color filters, each micro color filter being combined with one segment and arranged in correspondence with one pixel. Along a top edge of the LCD panel 15, there is an icon display panel 72 for displaying icons thereon, as will be described later. Above the icon display panel 72, another LCD panel is provided as a data display panel 73. On the data display panel, a serial number of the recorded image frame, the number of remaining instant films, and selected photographic conditions are displayed.

On one side of the LCD panel 15, there are a cancel key 78a, an execution key 78b, cursor keys 78c and 78d for left and right, which are arranged in a cross. Above these keys, there are an imaging mode key 79a and a display mode key 79b. A print mode key 80 and a template key 81 are located in a lower portion of the camera body 2. Designated by 82 and 83 are a flash mode switching key and a data compression rate selection key, respectively. The operations of these keys will be described later. A bracket 85 for holding an external memory 84 is mounted inside the camera body 2, such that the bracket 85 may be drawn out from the bottom of the camera body 2. For example, a memory card called SMART MEDIA (a trade name), that is provided by the present applicant, is usable as the external memory 84.

Figure 10:
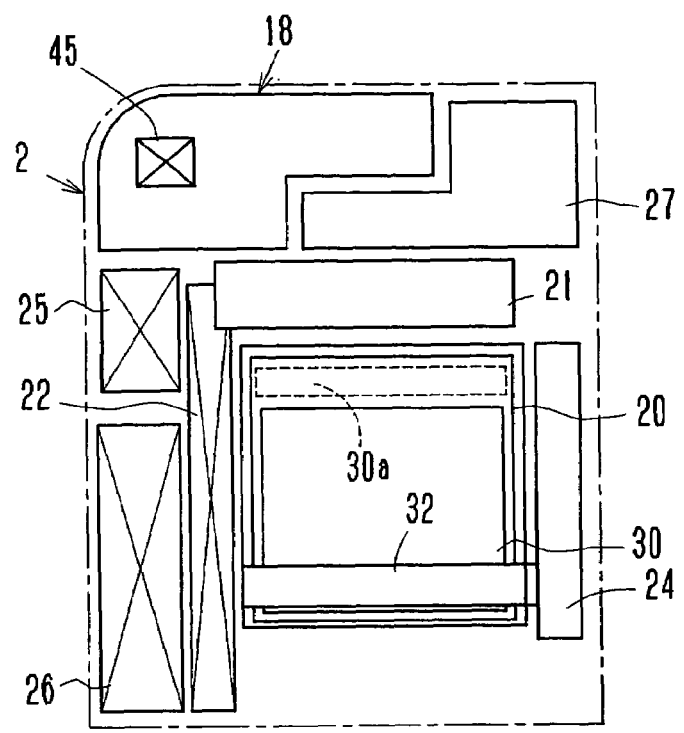
FIG. 10 is an explanatory diagram illustrating a layout of the interior of the electronic still camera shown in FIG. 8.

FIG. 10 shows a layout of respective members inside the camera body 2 as viewed from the front. An imaging unit 18 including a CCD image sensor is disposed behind the camera lens 3, and the developing rollers 21, a developing mechanism 22 for driving the developing rollers 21, a circuit board 27 of a flash device and a head moving mechanism 24 are arranged around a chamber for loading a film pack 20 therein. Also, a developing motor 25 for activating the developing mechanism 22 and a power source battery 26 are mounted.

Figure 11:
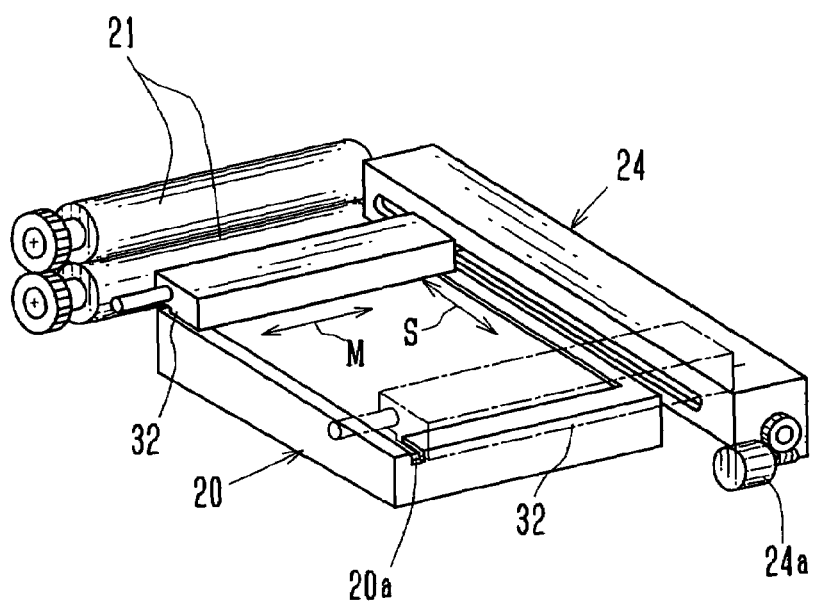
FIG. 11 is a perspective view of the instant printer incorporated into the electronic still camera shown in FIG. 8.

FIG. 11 illustrates an instant printer section constituted of the head moving mechanism 24 and a printing head 32. The printing head 32 has the same construction as shown in FIG. 5, consisting of a white light fluorescent lamp, an array of liquid crystal segments and a color filter having a red pass filter portion, a green pass filter portion and a blue pass filter portion. The printing head 32 extends in a direction M perpendicular to the advancing direction of the instant film 30, hereinafter referred to as a main scan direction M. When the head moving mechanism 24 is driven by a scanning motor 24a, the printing head 32 is moved in a sub scan direction S parallel to the film advancing direction. In the same way as the first embodiment, the printing head 32 makes one and half reciprocation in the sub scan direction S for each printing of one frame, to make a print in the three color frame sequential fashion.

Figure 12:
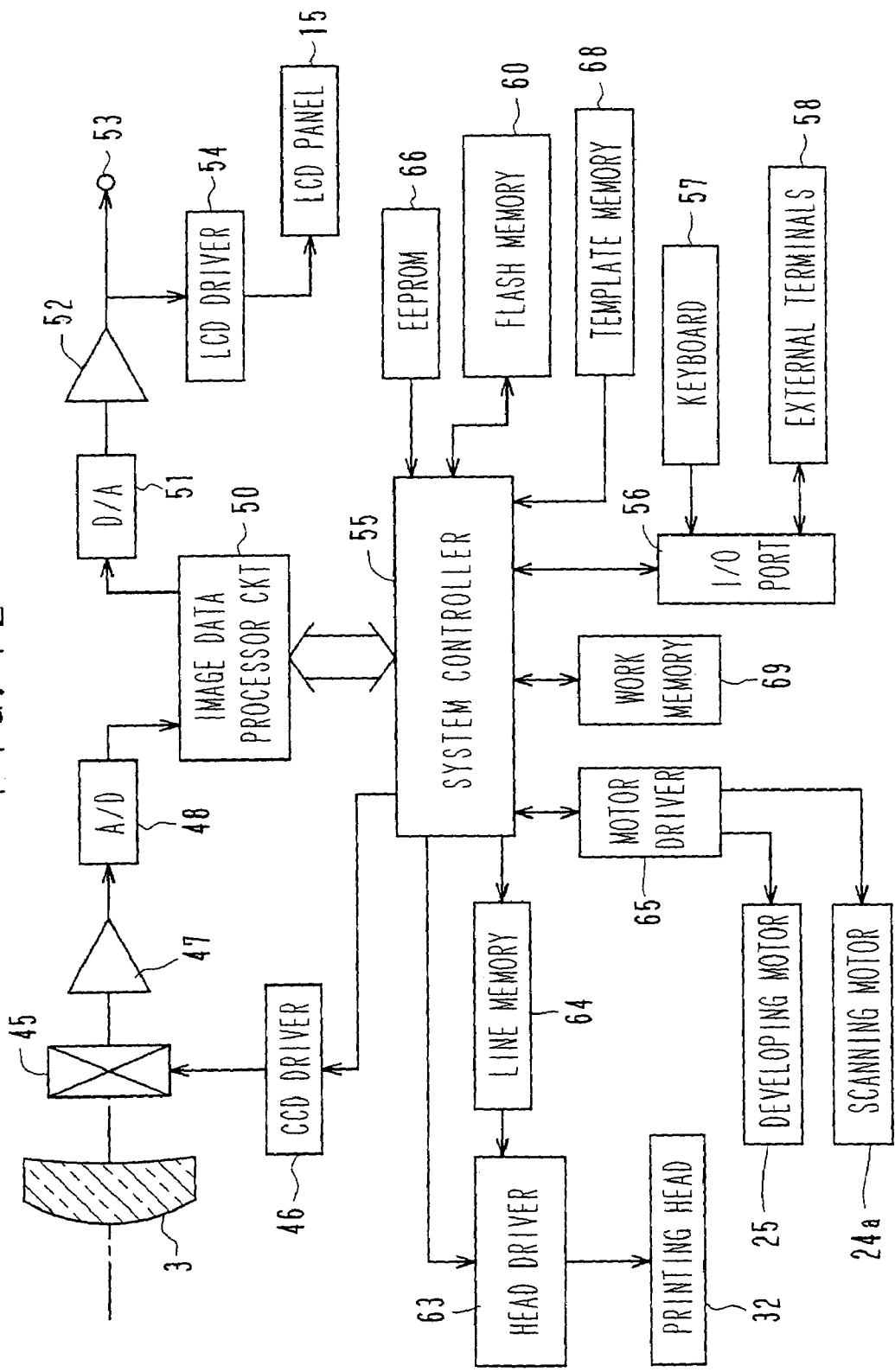
FIG. 12 is a block diagram illustrating an electric construction of the electronic still camera shown in FIG. 8.

FIG. 12 illustrates the circuitry of the electronic still camera shown in FIG. 8. Because the construction is fundamentally equal to that shown in FIG. 6, like elements are designated by the same reference numbers, and the description of those elements is omitted. The following description relates only to those features essential to the present embodiment.

A system controller 55 controls an image data processor circuit 50 and all the other electric operations of the electronic still camera. The system controller 55 monitors signals from a key board 57 and a group of external terminals 58 through an I/O port 56, and operates for the signal processing in accordance with the input signals. The key board 57 monitors operations of the shutter release button 75, the cancel key 78a, the execution key 78b, the cursor keys 78c, 78d, the imaging mode key 79a, the display mode key 79b, the print mode key 80, the template key 81 and the flash mode switching key 82 and the data compression rate selection key 83, and inputs respective operation signals to the system controller 55. The external terminals 58 are used for writing data in an external memory 84, or reading data from the external memory 84, as well as for data communication with external apparatuses.

EEPROM 66 previously stores various kinds of adjustment data, which are referred to by the system controller 55 when the electronic still camera is operated according to a predetermined sequence. The EEPROM 66 further stores compensation data and control data for use in image editing. A motor driver 65 drives the developing motor 25 and the scanning motor 24a under the control of the system controller 55.

A work memory 69 has a capacity to store image data of a single still image frame. In an imaging mode, the work memory 69 is used for temporarily storing image data before the image data is written in a flash memory 60. In a display mode and a print mode, image data of a selected image frame is read out from the flash memory 60 and is temporarily stored in the work memory 69, so the selected image is displayed on the LCD panel 15 on the basis of the image data read out from the work memory 69. Also on a template composing process or on a color balance or density control process, which will be described later, the work memory 69 stores original image data read out from the flash memory 60.

Figure 13:
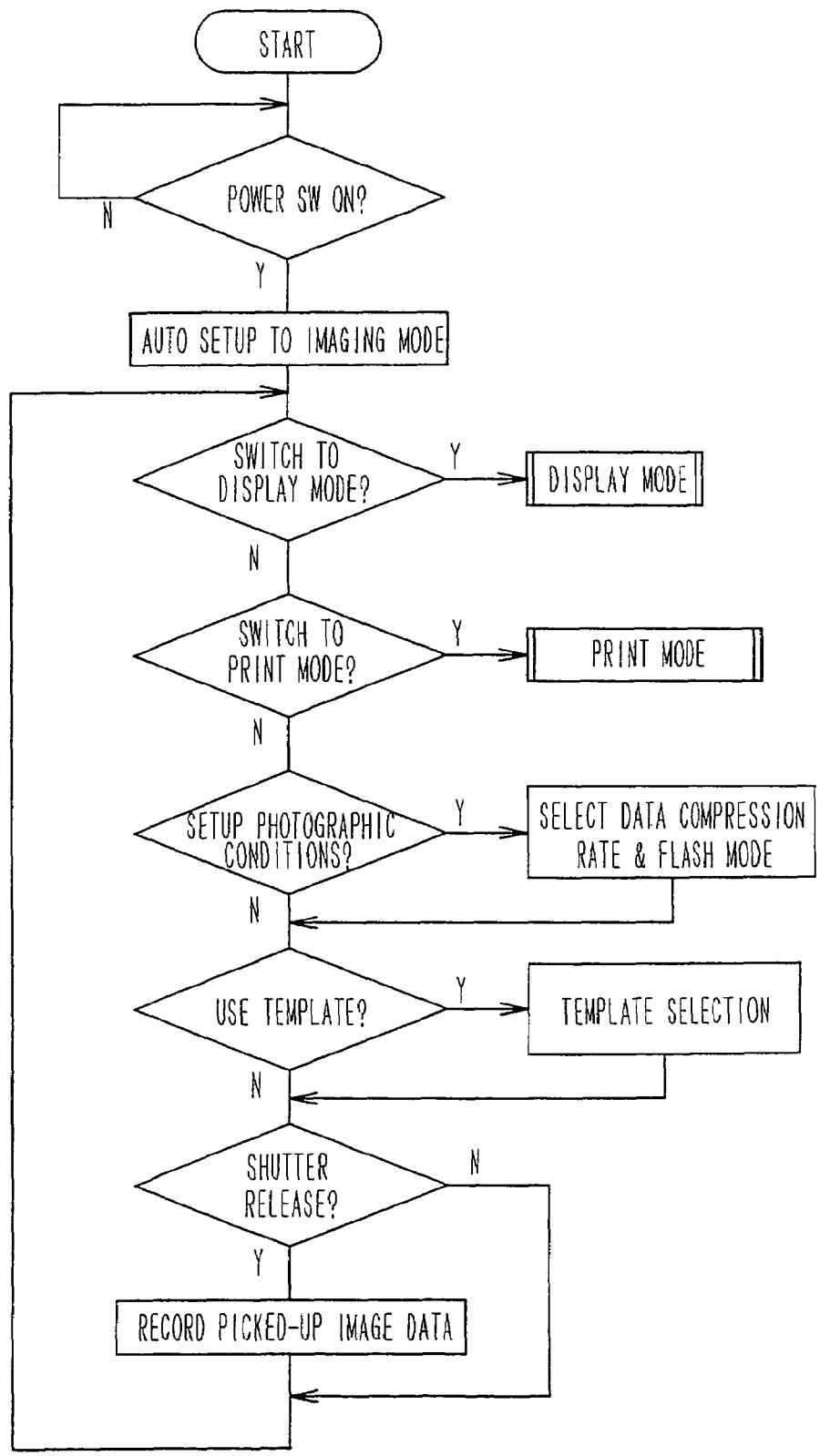
FIG. 13 is a flow chart illustrating an operation sequence responsive to a power source being turned on, in the electronic still camera shown in FIG. 8.

Now, the operation sequence of the electronic still camera having the above-described construction will be described. When an ON signal from the power switch 70 is fed to the system controller 55 through the keyboard 57 and the I/O port 56, the system controller 55 automatically starts up the electronic still camera with the imaging mode, in accordance with the flow chart shown in FIG. 13. In this state, an imaging and recording device is in a standby position, which is constituted of a CCD image sensor 45, a CCD driver 46, an amplifier 47, an A/D converter 48, the image data processor circuit 50 and the system controller 55. Unless the display mode key 79b or the print mode key 80 is operated, the electronic still camera is maintained in the imaging mode where the CCD image sensor 45 picks up subject images through the camera lens 3.

The image pick-up signal from the CCD image sensor 45 is converted into digital image data through the amplifier 47 and the A/D converter 48. The image data processor circuit 50 operates for the signal processing of the image data for white balance adjustment, gamma correction and the like. The image data thus processed is converted into a signal corresponding to the NTSC method, and is fed to the LCD driver 54 through a D/A converter 51 and an amplifier 52. As a result, a subject image is displayed on the LCD panel 15 in a real time fashion.

In the imaging mode, the flash mode switching key 82, the data compression rate selection key 83 and the template key 81 are made effective. The flash mode switching key 82 is provided for turning the flash device on or off, for setting up a special flashing for avoiding red-eye phenomena, or another flash condition. The data compression rate selection key 83 is provided for selecting a data compression rate on recording image data of one frame in the flash memory 60. The photographic conditions selected by operating these keys 82 and 83 are displayed on the data display panel 73.

Figure 14:
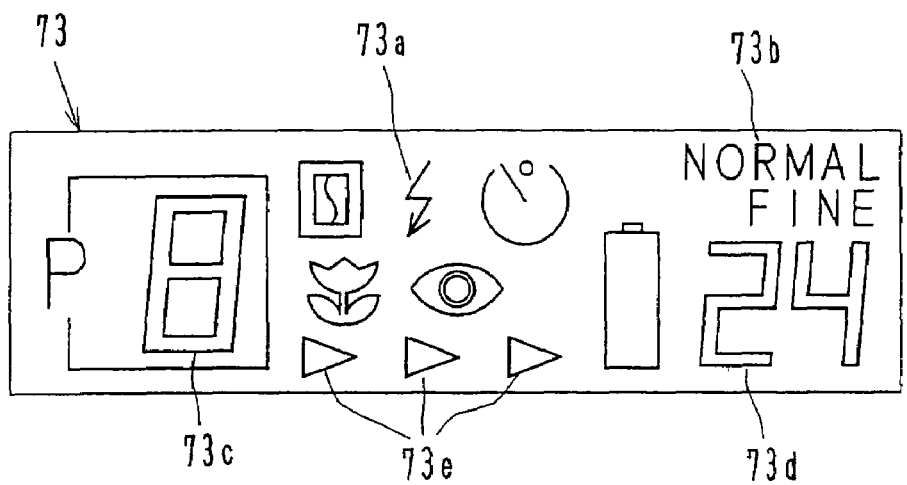
FIG. 14 is an explanatory diagram illustrating respective display patterns on a data display panel of the electronic still camera shown in FIG.

FIG. 14 shows an example of display pattern on the data display panel 73. The data display panel 73 is provided with a flash mode display segment 73a, a data compression rate display segment 73b, a segment 73c for displaying the number of remaining films, a segment 73d for displaying the serial number of the recorded image frame, a segment 73e for displaying the printing progress, and other segments for indicating battery conditions, for indicating that the close-up photography is selected, and so forth.

After setting up photographic conditions, upon each operation of the shutter release button 75, the image data processor circuit 50 takes in an image pick-up signal of one frame that is obtained at that moment from the CCD image sensor 45 through the amplifier 47 and the A/D converter 48. The image data of one frame processed in the image data processor circuit 50 is temporarily written in the work memory 69 and then transferred to the flash memory 60, to be written therein. Before the image data of one frame is completely written in the flash memory 60, a still image is displayed on the LCD panel 15 on the basis of the image data written in the work memory 69. Each time the image data of one frame is written in the flash memory 60, the number displayed on the frame number display segment 73*d* increments.

Figure 15:
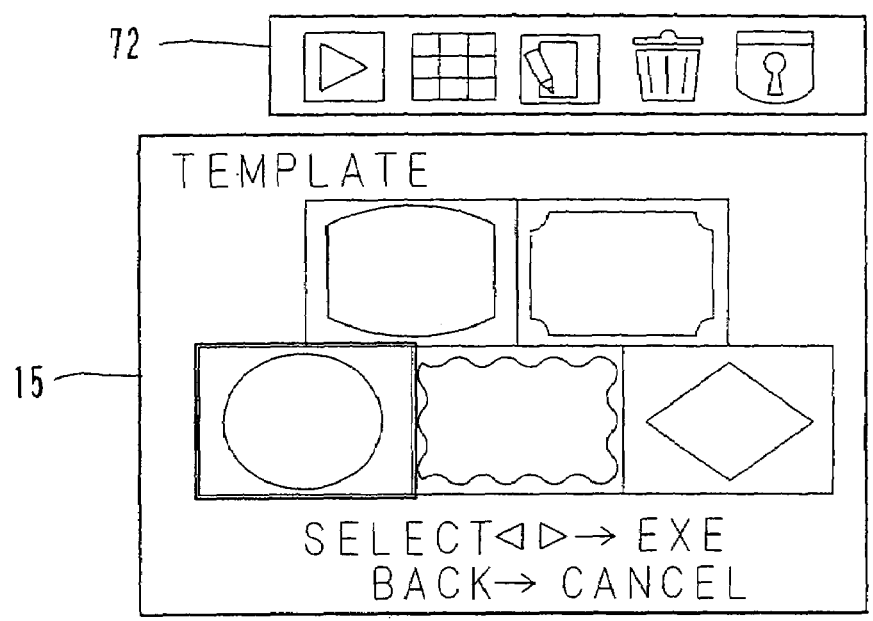
FIG. 15 is an explanatory diagram illustrating a screen displayed for selecting a template on the electronic still camera shown in FIG. 8.

When using a template with the photography, the template key 81 is pressed. Then the finder image on the LCD panel 15 disappears, and five kinds of templates are displayed instead, as shown in FIG. 15, which are previously stored in a template memory 68. The user selects one from among these templates by moving a framing line through the cursor keys 78*c* and 78*d*. The template framed by the framing line at the time when the execution key 78*b* is pressed, i.e. an oval template in the shown example, is decided to be used for the photography.

Figure 16:
FIG. 16 is an explanatory diagram illustrating a screen displayed after a template is decided on the electronic still camera shown in FIG. 8.

After the template is selected, the selected template is displayed with the finder image on the LCD panel 15, as shown in FIG. 16. At that time, the template is displayed as a gray semi-transparent frame with a see-through center portion, so that the finder image can be observed. This is for the sake of framing the subject with regard to the shape of the template as well as the printing range of the subject image. It is to be noted that letters and symbols displayed on a lower portion of the LCD panel 15 in FIG. 16 are utilized in the display mode, and are not displayed in the imaging mode.

When the shutter release button 75 is pressed while the template is displayed with the finder image, image data of the subject image and image data of the template is written in combination in the flash memory 60. That is, among the subject image data, image data pieces of those areas which are covered with the peripheral portion of the template are replaced with the template image data. Accordingly, the image frame always includes the template when displayed or printed.

If the display mode key 79*b* is operated in the imaging mode, the CCD driver 46 is disconnected from the power source, and the CCD image sensor 45 is turned off. The system controller 55, the image data processor circuit 50, the D/A converter 51, the amplifier 52, the LCD driver 54 and the LCD panel 15, which constituting a display device, are kept being supplied. Also, the work memory 69 is set in a state for reading out the image data from the flash memory 60 to display recorded image frames on the LCD panel 15 based on the read image data.

Figure 18:
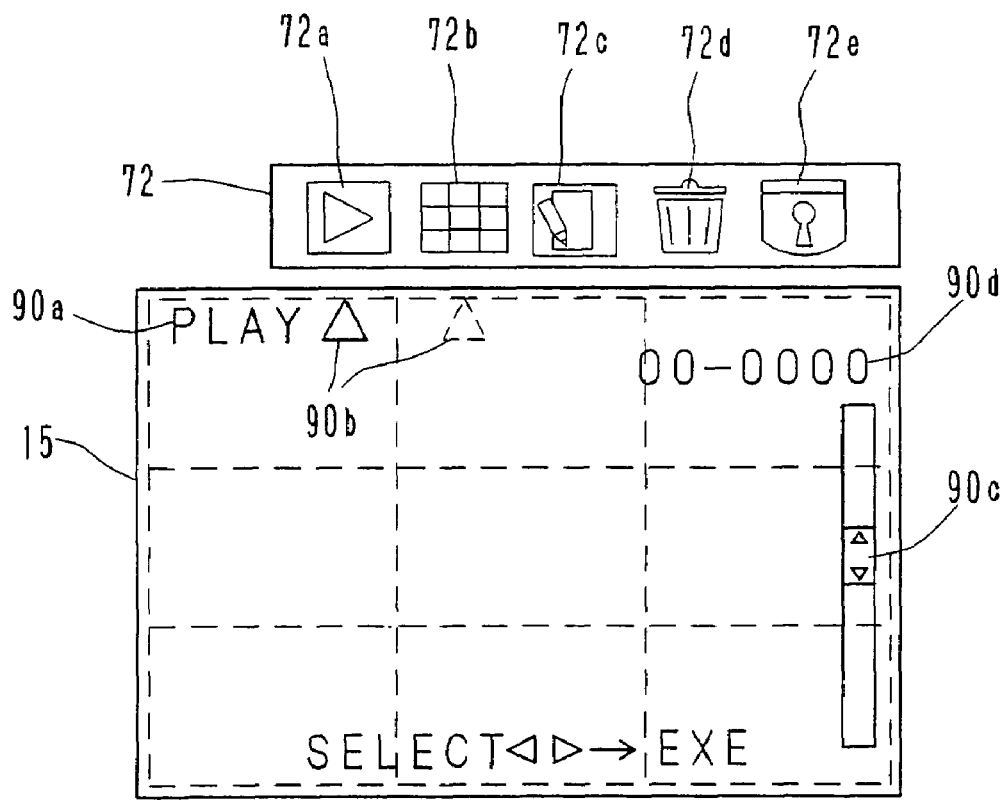
FIG. 18 is an explanatory diagram illustrating a screen displayed when the electronic still camera shown in FIG. 8 is switched to the display mode.
Figure 17:
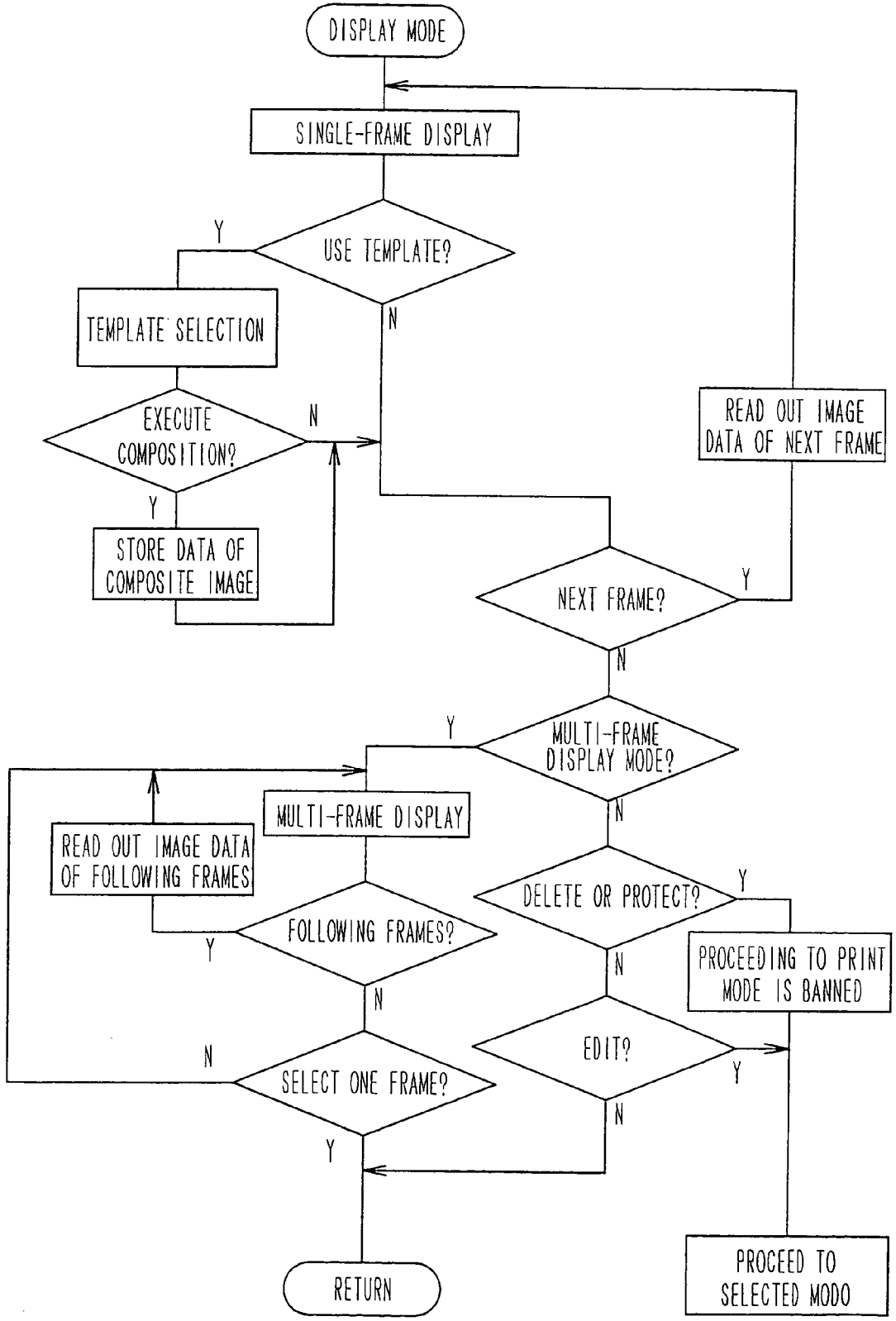
FIG. 17 is a flow chart illustrating an operation sequence in a display mode of the electronic still camera shown in FIG. 8.

FIG. 17 shows the processing sequence in the display mode. When the display mode is selected, the electronic still camera is first set to a single-frame display mode, wherein the LCD panel 15 displays an indicia "PLAY" 90*a*, a cursor 90*b*, a scroll bar 90*c* and a frame ID number 90*d*, as shown in FIG. 18. The cursor 90*b* is for pointing one of the icons 72*a*, 72*b*, 72*c*, 72*d* and 72*e* displayed on the icon display panel 72. In the shown example, the cursor 90*b* points the icon 72*a*, indicating that the single-frame display mode of the display mode is set at present. The icons 72*b* to 72*e* represent a multi-frame display mode, an edit mode, a delete mode and a protect mode respectively. For instance when the multi-frame display mode is selected, the cursor 90*b* is shifted to a position shown by dashed lines, pointing the icon 72*b*. Framing lines shown by dashed lines in FIG. 18 illustrate a display format of the image frames in the multi-frame display mode. Also a letter indicia is displayed on the lower portion of the LCD panel 15, as shown in FIG. 18.

In the single-frame display mode, another image frame is displayed on the LCD panel 15 upon each operation of the cursor key 78*c* or 78*d*, in accordance with the image data read out from the flash memory 60. By pressing the cursor key 78*c* or 78*d* continuously, the scroll bar 90*c* moves on the screen of the LCD panel 15. At the stop of pressing the cursor key 78*c* or 78*d*, the scroll bar 90*c* stops moving, and an image frame of a frame number corresponding to the stop position of the scroll bar 90*c* is displayed.

The template key 81 is usable in the single-frame display mode. Upon the template key 81 being pressed, image data of the image frame displayed on the LCD panel 15 at the present is transferred to the work memory 69, and the LCD panel 15 displays the five kinds of templates as shown in FIG. 15. An appropriate one of these templates is selected by operating the cursor keys 78*c* and 78*d* in the same way as described above. When the execution key 78*b* is operated to decide the selection, image data of the selected template is composed with the frame image data in the work memory 69, and the composite image is displayed on the LCD panel 15. Since the peripheral portion of the template image is displayed as a semi-transparent gray frame in the same way as above, the use can observe the template in relation to the subject image.

With the composite image of the subject image and the template, an indicia "OK?" and an instruction for the next procedure are displayed. If the selected template is determined to be unsuitable in view of the composite image, the cancel key 78*a* is pressed. Then the screen returns to the stage shown in FIG. 15, allowing the selection of another template. If the execution key 78*b* is operated in the stage where the composite image is displayed, the image data of the template is transferred to the flash memory 60 and is stored in a predetermined address along with the original image data of the subject image. When reading the image data of the corresponding frame again, the template image data assigned thereto is read out together to display the composite image. In this way, it is possible to compose an appropriate template with an image frame in the display mode, even though the image frame has been recorded without the template. Moreover, as the original image data of the subject image is entirely preserved, it is possible to reuse the original image data.

When the display mode key 79*b* is operated in the single-frame display mode, the mode is shifted to the multi-frame display mode, and the cursor 90*b* is shifted to the position pointing the icon 72*b* that represents the multi-frame display mode. Then the system controller 55 reads out image data of nine frames from the flash memory 60. The image data of nine frames is processed such that reduced images of the nine frames may be displayed on the LCD panel 15 in a 3×3 matrix, as implied by the dashed lines in FIG. 18. The processed image data is written in the work memory 69, so the nine image frames are displayed on the LCD panel 15.

In the multi-frame display mode, a framing line moves from one displayed frame after other on the LCD panel 15 upon each operation on the cursor key 78*c* or 78*d*. When the execution key 79*b* is operated while an appropriate one of the displayed frames is surrounded by the framing line, the one frame is selected. Then the mode is shifted to the single-frame displayed mode, and the image of the selected frame alone is displayed on the LCD panel 15. If the cursor key 78d for the right is operated in a position where the right bottom frame is surrounded by the framing line, the following nine image frames are newly displayed in the 3×3 matrix. If the cursor key 78c for the left is operated in a position where the left top frame is surrounded by the framing line, the preceding nine image frames are displayed in the 3×3 matrix.

As subsidiary modes under the display mode, there are the delete mode, the protect mode and the edit mode in parallel to the single-frame display mode and the multi-frame display mode. By pressing the display mode key 79b, the mode is sequentially shifted from one other among these subsidiary modes. Along with this mode shifting, the cursor 90b on the LCD panel 15 points the corresponding one of the icons 72a to 72e on the icon display panel 72.

In the edit mode, it is possible to control color balance and density of one image frame displayed on the LCD panel 15. The cursor 90b moves to a position pointing the icon 72c, and an edit menu is displayed on the LCD panel 15, over the subject image. Thereafter, color balance and density of the subject image are controlled by operating the cursor keys 78c and 78d, and the execution key 78b or the cancel key 78a in accordance with the edit menu.

The image data to edit is written in the work memory 69, so the image data is controlled on the work memory 69 in response to the controlling operations. The controlling operation is performed while checking the controlled conditions on the image displayed on the LCD panel 15. When the execution key 78b is operated at the conclusion of controlling, data of correction and control effected on the image data on the work memory 69 is transferred to the flash memory 60, and is stored as correction data for the corresponding frame in a predetermined address. Thereafter when the image data of the corresponding frame is read out, the correction data is concurrently read out, so that a controlled image is displayed on the LCD panel 15.

In the delete mode, it is possible to delete image data of one frame displayed in the single-frame display mode from the flash memory 60. When the execution key 78b is operated while the cursor 90b points the icon 72d, a deletion menu is displayed on the LCD panel 15 over the subject image. Thereafter, image data of a selected image may be deleted in accordance with the deletion menu. The deletion menu contains a program for simultaneous deletion of image data of a plurality of frames from the flash memory 60.

Furthermore, there is a deletion menu for deleting image data alone from the external memory 84, and not deleting formatting data, as well as a menu for formatting the external memory 84 to be usable to the electronic still camera. If the external memory 84 already stores some image data when it is subjected to the formatting, the image data is deleted and formatting data is newly written.

By shifting the cursor 90b to the position pointing the icon 72e and then operating the execution key 78b, a protection menu is displayed on the LCD panel 15 over the subject image. When a protection process is carried out on a selected frame, it comes to be impossible to rewrite or delete image data of that frame. There is a menu for effecting the protection process on a plurality of frames or on all frames at the same time. The protection menu also includes a menu for cancelling the protection of one or more of the protected frames.

Figure 19:
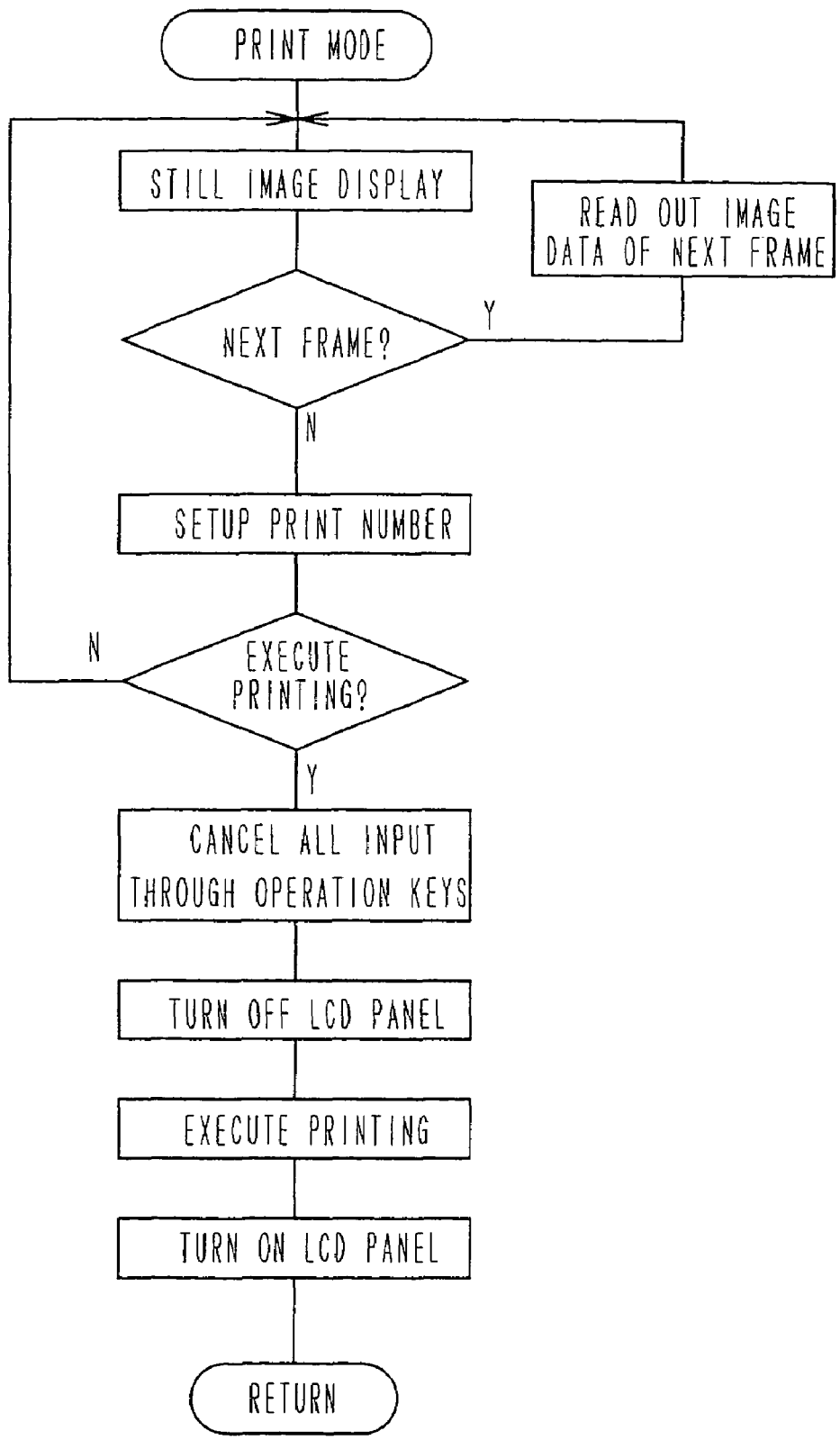
FIG. 19 is a flow chart illustrating an operation sequence in a print mode of the electronic still camera shown in FIG. 8.

When the print mode key 80 is operated in the imaging mode or in the display mode except the delete mode and the protect mode, the electronic still camera is immediately switched to the print mode. In the print mode, as shown in FIG. 19, the LCD panel 15 displays a still image on the basis of image data stored in the work memory 69 at the time of switching to the print mode.

For instance when it is switched from the imaging mode to the print mode, the work memory 69 stores one frame of image data picked up and recorded last in the flash memory 60, so the image of the last recorded frame is displayed on the LCD panel 15. When it is switched from the edit mode to the print mode, an image is displayed based on image data that has been transferred to the work memory 69 for the edition process. If the image data is rewritten by composing the template in the display mode, the subject image composed with the template is displayed. It is to be noted that if the print mode key 80 is operated in the multi-frame display mode, a multi-frame is displayed since the work memory 69 stores image data for displaying the multi-frame at that time.

Together with the image to print, the LCD panel 15 displays a print menu as literal indicia, so that it is possible to set the number of prints to make by operating the cursor keys 78c and 78d and the execution key 78b. The maximum number of available prints is limited up to the remaining number of instant films that is displayed on the segment 73c of the data display panel 73. After assigning the number of prints, the execution key 78b is operated to let the printing head 32 make printing. During the printing, the LCD panel 15 is turned off to reduce the power consumption.

At the start of printing process, the system controller 55 invalidates any input through the operation keys. Even if the power switch 70 is turned off, power supply is maintained to the line memory 64, the head driver 63, the printing head 32, the motor driver 65, the developing motor 35, the scanning motor 24a and the work memory 69, which constitute a printing device. However, when the cancel key 78a is operated during the printing after a plurality of prints are designated to make, the printing process is terminated with the instant film that is subjected to the printing at the time of operating the cancel key 78a.

The system controller 55 accesses the work memory 69, to sequentially read out red-color image data of a first line representative of densities of red pixels of the first line, and is transferred to the line memory 64. Thus, the line memory 64 comes to store the red-color image data of the first line. The system controller 55 confirms that the red pass filter portion of the color filter is inserted into the printing light path, and that all LCD segments of the LCD array of the printing head 32 are their light-shielding state. Then the system controller 55 turns on the fluorescent lamp of the printing head 32.

The printing head 32 is in an initial position confronted with the bottom edge of the instant film 30, as show by phantom lines in FIG. 11. The initial position is a position to start recording the first line. The system controller 55 confirms that the printing head 32 is in the initial position by use of a photo sensor (not shown). Then the image data of the first line is sent from the line memory 64 sequentially to the LCD array, so the respective transmittance densities of the LCD segments are set at values corresponding to the image data. The red printing light from the red pass filter portion of the color filter 36 travels through the LCD segments, so the instant film 30 is exposed to the red printing light of different amounts determined by the transmittance densities of the respective LCD segments. In a predetermined time, the LCD segments are reset to the light-shielding state.

At the conclusion of exposure to the red printing light for the first line, the scanning motor 24a, which is a stepping motor, rotates through a predetermined angle, shifting the printing head 32 to a position of a succeeding line. Thereafter, red-color image data representative of densities of red pixels of the second line is transferred from the work memory 69 to the line memory 64. The second line is exposed to the red printing light in a similar manner to the first line. The printing head 32 is shifted toward the developing rollers 21 in a stepwise manner, while each line is exposed to the red printing light. When a final line has been exposed to the red printing light, printing of red pixels of one frame is completed.

Then the system controller 55 sends the head driver 63 a filter change signal, to insert the green pass filter portion in the printing light path in place of the red pass filter portion. The system controller 55 accesses the work memory 69, serially reads out green-color image data representative of green pixels of the final line from among the image data, and transfers the green-color image data to the line memory 64.

Thereafter, the instant film 30 is exposed to the green printing light in the same way as above, but in the direction from the final line to the first line. After the completion of printing the green pixels of one frame, the blue pass filter portion is inserted in the printing light path. While blue-color image data representative of blue pixels of the subject image is read line by line from the flash memory 60, each line is exposed to the blue printing light.

After the exposure with the three-color printing light is completed, the printing head 32 is placed in a retreat position which is shifted toward the developing rollers 21 from the initial position as shown by solid line in FIG. 11.

After the printing head 32 moves in the retreat position, the developing motor 25 starts actuating the developing mechanism 22 in response to a signal from the system controller 55, to move the advance claw into the cutout 20a of the film pack 20. The advance claw pushes the exposed one of the instant films 30 out of the film pack 20. While the printing head 32 makes the exposure, the printing process is displayed on the segment 73e of the data display panel 73.

As the instant film 30 is pushed by the advance claw, the top edge of the instant film 30 comes in between the developing rollers 21. Thereafter, the developing rollers 21 rotate to advance the instant film 30 and, at the same time, break the solution pod 30a to spread the processing solution. The advance claw makes one stroke of reciprocation, and then stops at its home position. Upon the advance claw returning to its home position, the scanning motor 24a is driven to move the printing head 32 to its initial position. The instant film 30 is ejected through the film exit 10 out of the camera body 2 while pushing open the door 11. In one or a couple of minutes, the subject image is fixed as a positive image on the image receiving sheet, providing a hard copy of the image selected to be printed.

When the printing process is finished, the LCD panel 15 is driven again to display the image frame selected to be printed. To print another image frame in succession, the image frame to print is selected by operating the cursor keys 78c and 78d and the execution key 78b, and is printed in the same procedures as above. To switch over from the print mode to other mode, the cancel key 78a is operated at the stage where one image frame is displayed. If the number of prints is already set, the print number setting is canceled by the cancel key 78a and, thereafter, the cancel key 78a is operated again. Then, the electronic still camera is reset to the previous mode that is selected before the print mode is selected. In this stage, the operation on either the imaging mode key 79a or the display mode key 79b is accepted as a valid selection signal.

As described so far, according to the electronic still camera of the present embodiment, the imaging function, the display function and the printing function are arranged in parallel to each other in view of the operation sequence, whereas subsidiary modes such as the edit mode, the delete mode, the protect mode, and the multi-frame display mode are arranged under the display mode. If the print key 80 is operated in the display mode, the mode is quickly shifted to the print mode except when an operation on the execution key 78b is required. After being shifted to the print mode, an image displayed at present on the LCD panel 15 is automatically selected to be printed. Therefore, it is possible to print an image as soon as the image is recorded or edited. Thus, the electronic still camera of the present embodiment is superior in workability.

Since all the input through the operation keys are invalidated after the execution of the printing process till the conclusion thereof, the printing process is performed stably while eliminating the danger of noise overlapping and reducing the load on the power source. Because the widely used instant film pack is used as the photosensitive recording medium, it is easy to handle the instant films.

Moreover, the electronic still camera is automatically set in the imaging mode when the power switch 70 is turned on. Also when the shutter release button 75 is pressed halfway in the display mode, if the operation on the execution key 78b is not required, the mode is quickly shifted to the imaging mode. After an image frame is recorded by pressing the shutter release button 75 further to the full, it returns to the display mode. In this way, it is easy to switch the electronic still camera to the imaging mode, the user can avoid losing the shutter chance.

For the sake of power-saving, it is preferable to add an auto cutoff function for cutting off the power source when the electronic still camera is left for a while, e.g., five minutes, without any operation. In that case, when any one of the operation keys is operated in the auto cutoff condition, the electronic still camera returns to the active condition, preferably to the previous mode immediately before the auto cutoff.

To embody the present invention, the construction of the printing head is not limited to the above described embodiments. For example, an array of micro light emitting diodes (LED) are usable as a light source of the printing head. By providing three kinds of micro LED for emitting red, green and blue light beams respectively, a color filter is not needed for the printing head. By allocating one micro LED to one LCD segment of the LCD array, it is possible to control the intensity of printing light through the LCD segment in accordance with the image data.

It is also possible to use such a light source whose light contains the three colors and which can control the amounts of the respective light beams, e.g. a fluorescent light source array having micro fluorescent light emitting elements arranged in a line, wherein each micro fluorescent light emitting element corresponds to one pixel and emits light on the light emission principle of the fluorescent light display tube. Then, it is possible to omit the LCD array, because the light amount may be controlled for each pixel by the fluorescent light source array itself.

Although the instant printer section of the above embodiment is designed to print a full-color image in the three color frame sequential fashion, it is possible to record a full-color image at one sub scanning operation by simultaneously projecting three color printing light beams from the printing head. The following description relates to instant printers that can print a full-color image at one sub scanning operation, and are suitable for incorporating into an electronic still camera.

Figure 20:
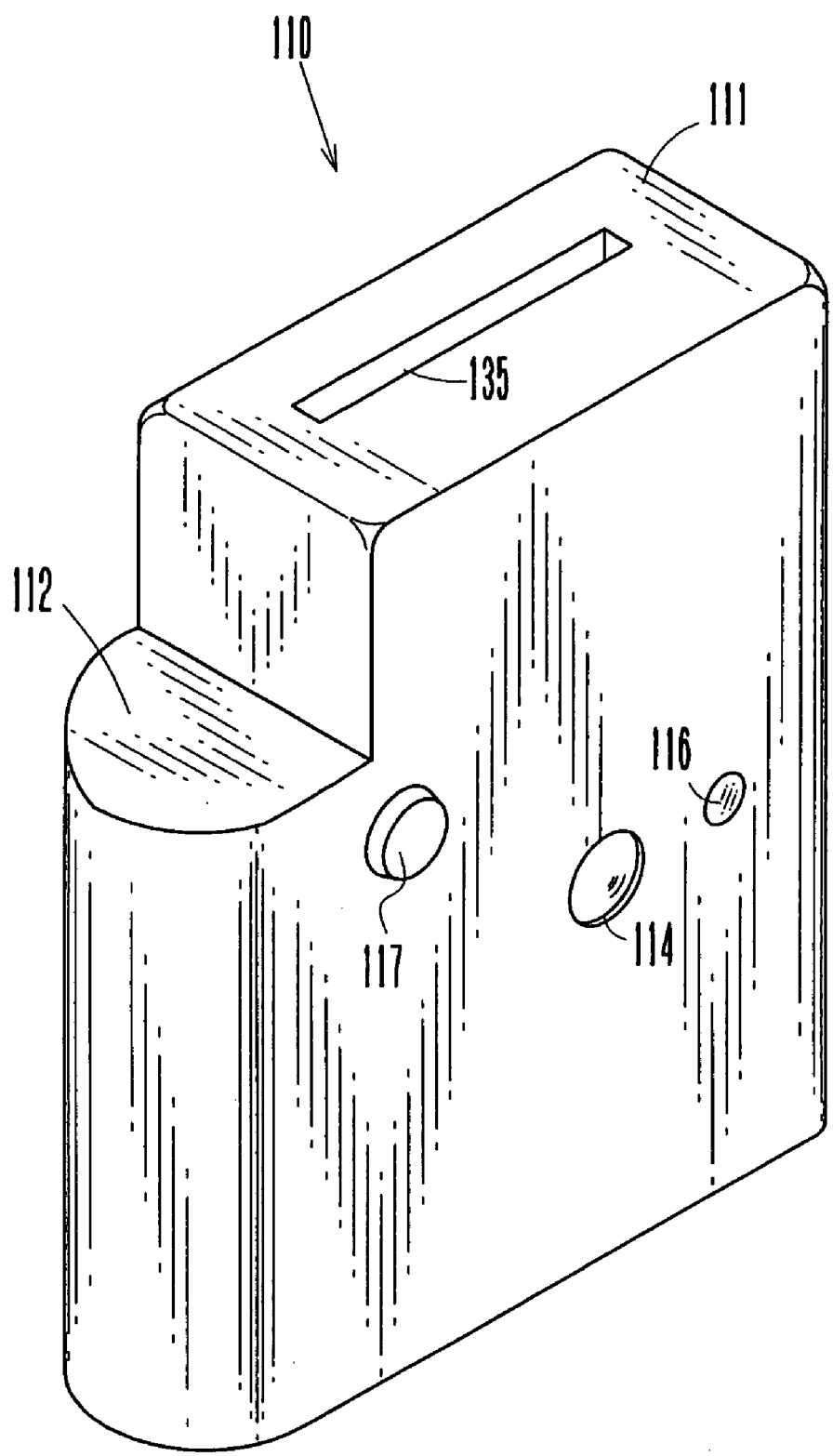
FIG. 20 is a front perspective view of an electronic still camera having an instant printer incorporated thereinto, according to a third embodiment of the invention.

FIG. 20 shows an electronic still camera 110 having an instant photo printer incorporated therein, wherein a grip portion 112 is provided on the left side of a camera body 111 as viewed from the front. The grip portion 112 contains a battery 113 (see FIG. 21).

A camera lens 114 is placed at a center of the front of the camera body 111. An image pick-up section 115 including a CCD image sensor is disposed behind the camera lens 114 (see FIG. 22). A light receptive member 116 of a not-shown automatic exposure control (AE) section is provided adjacent to the camera lens 114. A subject brightness signal is sent from the AE light receptive member 116 to the AE section, which then controls the exposure automatically at each exposure in a well-known manner. A shutter button 117 is placed in proximity to a top surface of the grip portion 112. The electronic still camera 110 may also be provided with a flash device, an auto-focusing device, a zooming device or the like.

Figure 22:
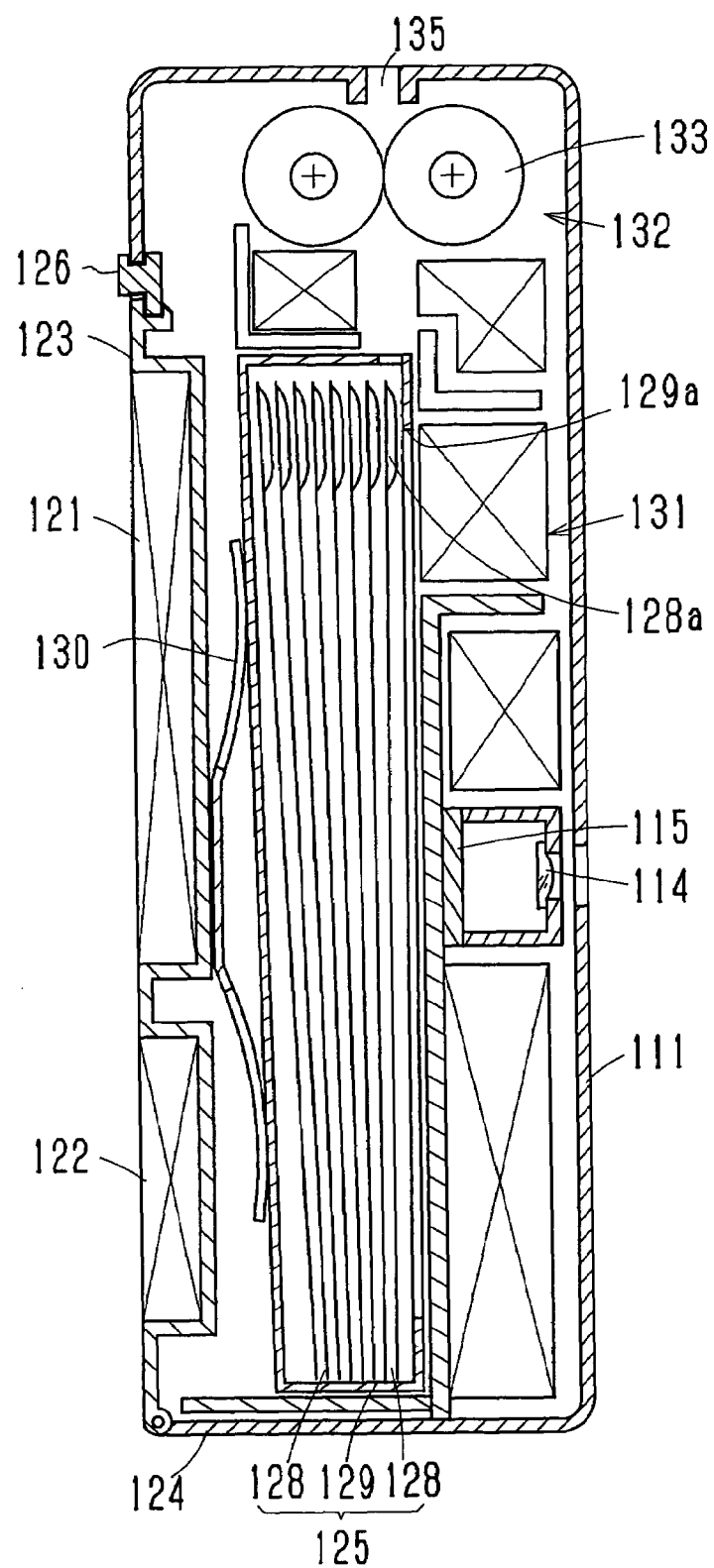
FIG. 22 is a schematic vertical sectional view of the electronic still camera shown in FIG. 20.
Figure 23:
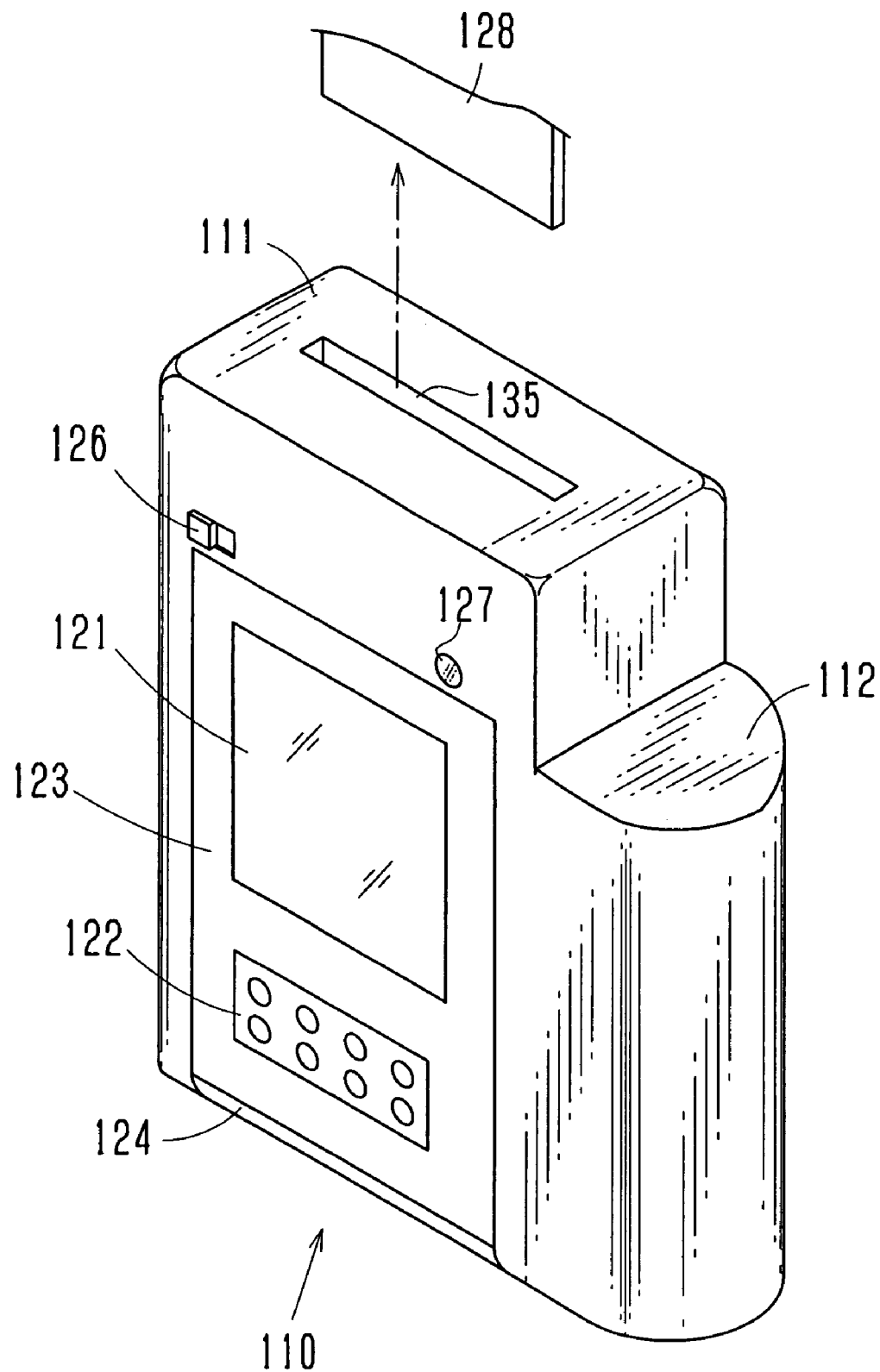
FIG. 23 is a rear perspective view of the electronic still camera shown in FIG. 20.

As shown in FIG. 23, a pack loading door 123 is pivotally mounted to the back side of the camera body 111 through a hinge 124. The pack loading door 123 is normally locked in the closed position. A sliding knob 126 is operated to open the pack loading door 123 for the purpose of inserting or removing a film pack 125 as shown in FIG. 22. A counter window 127 indicates the number of instant films exposed.

An LCD panel 121 and a control panel 122 are incorporated into the pack loading door 123. The LCD panel 121 displays an image of a photographic subject to be picked up through the camera lens 114 in a real time fashion, constituting an electronic viewfinder. The control panel 122 has various keys, including a mode changer key for switching between an image pick-up mode and a display mode, a frame selector key, a print start key, a deletion button for deleting image data, and a switching key for inputting and outputting image data with external apparatuses.

The film pack 125 consists of a plastic case 129 and a plurality of, e.g., 10 sheets of mono-sheet type instance films 128 contained in a pile in the plastic case 129. The top instant film 128 of the pile is urged by a spring 130 to position behind an exposure opening 129a of the case 129, as is shown in FIG. 22.

Figure 21:
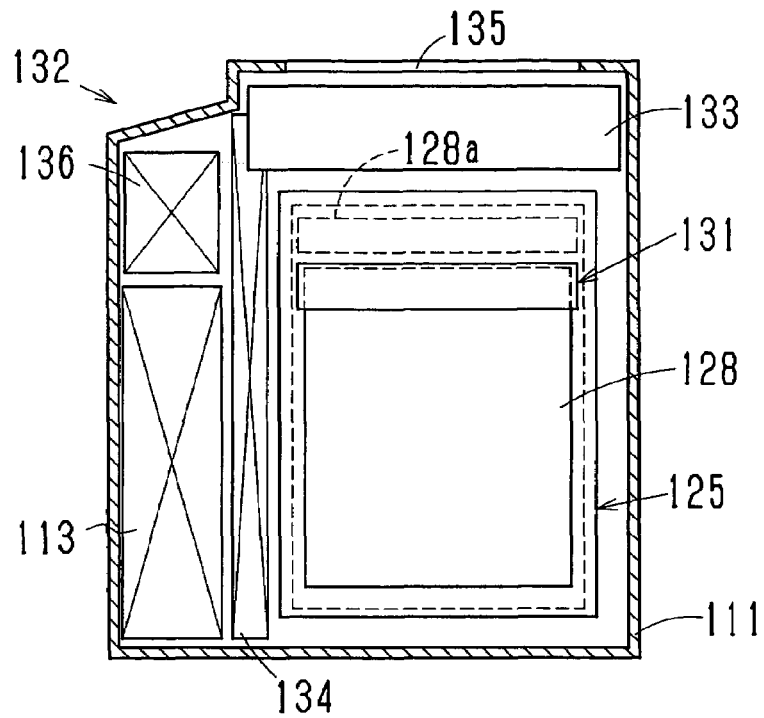
FIG. 21 is an explanatory diagram illustrating a layout of the interior of the electronic still camera shown in FIG. 20.

Inside the camera body 111, as shown in FIG. 21, there is a photo printer section for recording a full-color image on the instant film 128 of the film pack 125 placed behind the exposure opening 129a. The photo printer section consists of a printer head unit 131 including a multi-color projection type printing head, and a film advancing device 132. Synchronously with the instant film 128 being advanced to the outside by the film advancing device 132, the printing head is driven to record a full-color image on the instant film 128 at one scanning.

The film advancing device consists of a pair of developing rollers 133 and a developing mechanism 134 for driving the developing roller 133. The developing rollers 133 and the developing mechanism 134 are driven by a developing motor 136 to advance the exposed instant film 128 out of the film pack 125, and ejects it through a film exit 135 formed as a slit in a top face of the camera body 111.

The developing rollers 133 are biased by a spring in the direction to close to each other. Since the instant film 128 has a processing solution pod 128a along its top edge, the solution pod 128a is broken by the pressure of the developing rollers 133 while being advanced through the developing rollers 133. Thereby, the processing solution is spread between a photosensitive sheet and an image receiving sheet of the instant film 128. A positive image appears on the instant film in one minute to several minutes after the spread of the processing solution.

The developing mechanism 134 includes an advance claw and a mechanism for moving the advance claw, as well-known in the art. When the developing motor 25 rotates, the advance claw is actuated to push up the bottom edge of the exposed instant film 128, until the top edge of the instant film 128 comes between the developing rollers 133. After the instant film 128 comes between the developing rollers 133, since the developing rollers 133 have started rotation then, the instant film 128 is moved upwards by the developing rollers 133.

Figure 24:
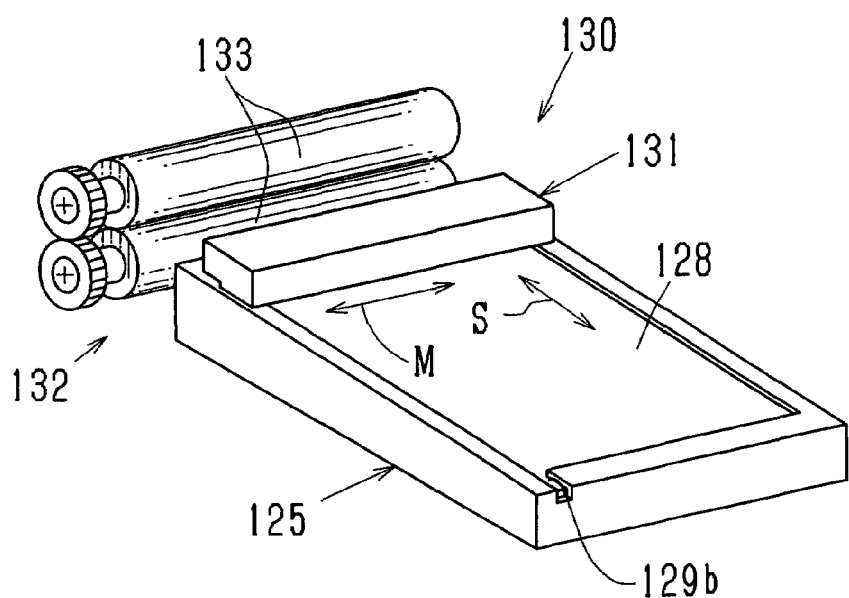
FIG. 24 is a perspective view of the instant printer incorporated into the electronic still camera shown in FIG. 20.

As shown in FIG. 24, the printer head unit 131 is located near a top edge of the exposure opening 125a of the film pack 25, with its longitudinal direction M oriented perpendicularly to the advancing direction S of the instant film 128. Hereinafter, the longitudinal direction M will be referred to as a main scan direction, whereas the direction S will be referred to as a sub scan direction. Designated by 129a is a cutout for the advance claw to enter the film pack 125 when pushing out the exposed instant film 128.

FIG. 25 shows a section of the printer head unit 131. The printer head unit 131 consists of the multi-color projection type printing head 138 and a head driver 139 which are accommodated in a light-shielding frame 137. The printing head 138 has a light emitting element array 141 and a micro lens array 142 extending in the main scan direction inside a case 140. The light emitting element array 141 consists of a row of red (R) light emitting elements 143, a row of green (G) light emitting elements 144 and a row of blue (B) light emitting elements 145. These rows of the light emitting elements 143 to 145 extend in the main scan direction and are shifted from each other in the sub scan direction. In this embodiment, the light emitting elements 143 to 145 are micro LEDs, each diode corresponds to one color pixel. Lighting time duration of each LED is individually controlled in accordance with the density of the pixel to record.

The micro lens array 142 consists of three rows of micro lenses 142a, 142b and 142c which are arranged in correspondence with the respective light emitting elements 143 to 145, such that the light beam from each light emitting element may not interfere with the other's. The micro lens array 142 may be constituted of SELFOC lenses. In order that three color light beams from the red light emitting elements 143, the green light emitting elements 144, and the blue light emitting elements 145 are focused in a line on the photosensitive surface of the instant film 128 along the main scan direction, the micro lenses 142a and 142c for the red and blue light beams, which are placed on the sides of the micro mirror array 142, are inclined to the middle row of micro lenses 142b for the green light beam.

Figure 26:
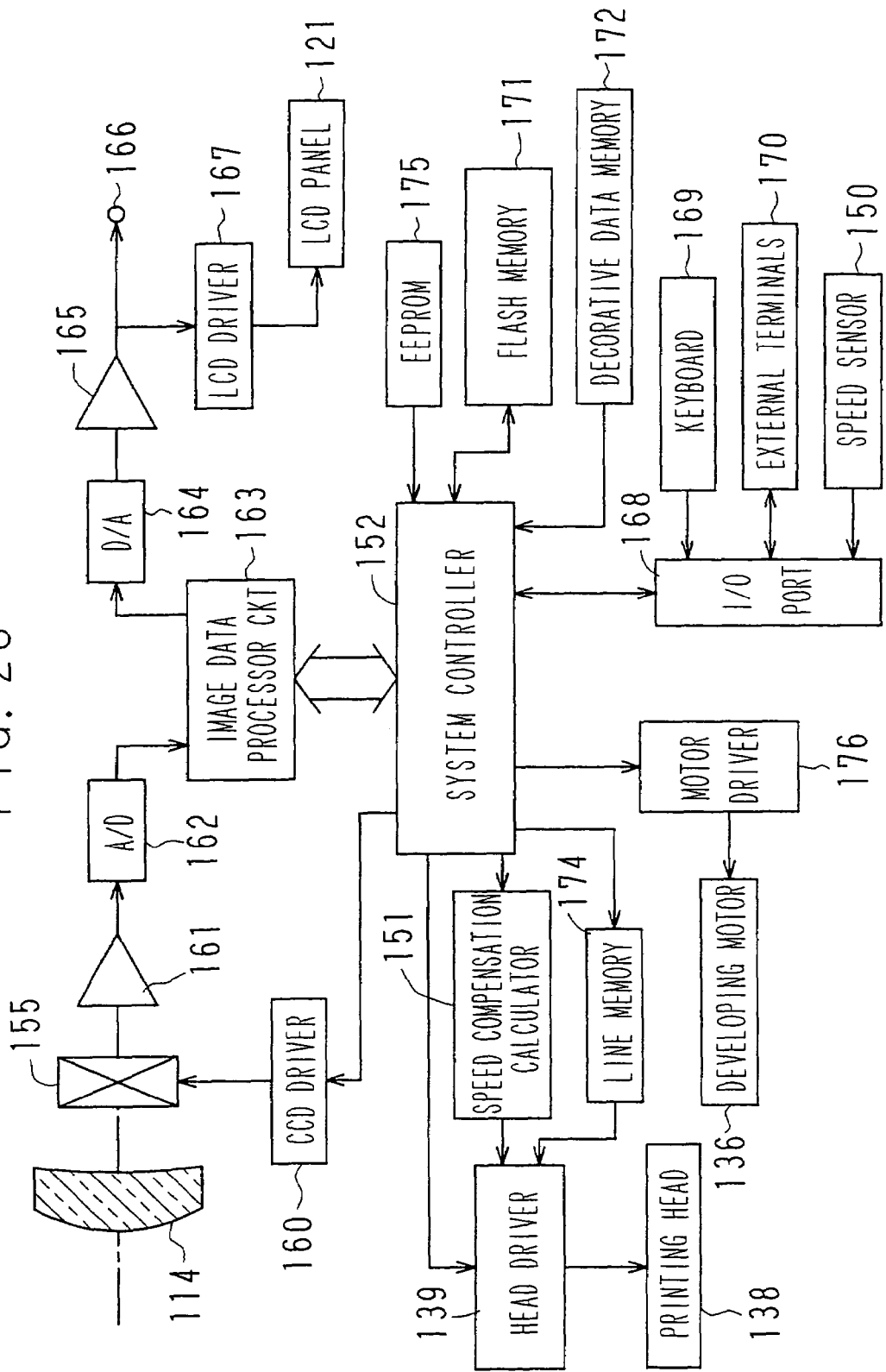
FIG. 26 is a block diagram illustrating an electric construction of the electronic still camera shown in FIG. 20.

Since the sub scanning is performed by advancing the instant film 28 to the film exit 135, if the film advancing speed fluctuates, the length of the pixels in the sub scan direction or the exposure density can vary, resulting unexpected density or color variations. In practice, the film advancing speed fluctuates on various reasons. For example, the film advancing speed fluctuates because of the consumption degree of the battery and mechanical factors, such as when an instant film thrusts through light-shielding flaps at a film exit of a film pack, when a solution pods is broken, while the processing solution is developed, or when the instant film gets over a trap section for absorbing redundant processing solution. To avoid the density variations caused by the variation in the film advancing speed, the electronic still camera 110 is provided with a speed sensor 150 and a speed compensation calculator 151, as shown in FIG. 26.

The speed sensor 150 is constituted of a roller which is in contact with and rotates with the instant film 128 being advanced, a pulse encoder connected to the roller, and a signal processing circuit. The signal processing circuit detects the film advancing speed of the instant film 128 by measuring the intervals of the encoder pulses with reference to a clock signal. A signal representative of the film advancing speed is sent to the speed compensation calculator 151 through a system controller 152.

On the basis of the film advancing speed signal from the speed sensor 150, the speed compensation calculator 151 produces compensation data for controlling timing of light emission, and sends the compensation data to the head driver 139, such that expected densities are obtained in correspondence with the image data in spite of the speed fluctuation.

As shown for instance in FIGS. 27(A) and 27(B), when the advancing speed of the instant film 128 changes from a value Va down to a value Vb (Vb<Va), a line printing cycle time PT for printing one line is elongated from a value PTa to a value PTb. The line printing cycle time PT consists of a total lighting time T1 of each LED that varies depending upon the density of the pixel to record, and a total intermission time T2 when the LED does not emit light. The total lighting time T1 is divided into a number of lighting time divisions t1 of an approximately equal length (T1=Σt1), and the lighting time divisions t1 are equally scattered over the line printing cycle time PT, interlaced or alternated with intermission time divisions t2(T2= Σt2).

Therefore, when the line printing cycle time is elongated, the lighting time divisions t1 are scattered at correspondingly longer intervals. Specifically, when the film advancing speed goes down, the intermission time divisions t2 take a larger value t2b, as shown in FIG. 27(B). On the contrary when the film advancing speed goes up, the intermission time divisions t2 take a smaller value t2b, as shown in FIG. 27(A). In this way, the respective light emitting elements are controlled to emit light at timings modified by the film advancing speed, the length and the density of the pixels is maintained unchanged, and unexpected density variation is prevented, even though the film advancing speed fluctuates.

FIG. 26 illustrates the circuitry of the electronic still camera 110. The CCD image sensor 155 is located behind the camera lens 114. When the camera lens 114 is focused, a subject image is formed on a photoelectric plane of the CCD image sensor 155. A CCD driver 160 drives the CCD image sensor 155 to convert the optical subject image photoelectrically into an electric image pick-up signal. Micro color filters of red, green and blue colors are arranged on the photoelectric plane of the CCD image sensor 155 in a matrix. The image pick-up signal is output color by color in a serial manner, and is amplified by an amplifier 161 at a suitable level, and converted by an A/D converter 162 into a digital form. It is to be noted that driving operation of the CCD driver 160 is synchronized with sampling timing of the A/D converter 162.

The A/D converter 162 produces digital image data from the image pick-up signal, and feeds the image data sequentially to an image data processor circuit 163. The image data processor circuit 163 operates for the signal processing of the supplied image data for white balance adjustment, gamma correction and the like. Moreover the image data processor circuit 163 produces a video signal corresponding to the NTSC composite signal from the processed image data. The video signal is sent through a D/A converter 164 and an amplifier 165 to an output terminal 166 for the video signal.

It is therefore possible to observe the subject image picked up by the CCD image sensor 155 in a continuous manner by connecting the output terminal 166 to a home television set. The video signal from the amplifier 165 is also fed to an LCD driver 167. As the LCD driver 167 drives the LCD panel 121 that is incorporated into the pack loading door 123, the LCD panel 121 displays the subject image in a continuous manner. Therefore the LCD panel 121 operates as the electronic viewfinder.

The system controller 152 controls the image data processor circuit 163 and all the other electric operations of the electronic still camera. The system controller 152 monitors signals from the control panel 122 and a group of external terminals 170 through an I/O port 168, and operates for the signal processing in accordance with the input signals.

A flash memory 171 is a DRAM which is accessible at high speed. The flash memory 171 stores the image data frame by frame after the image data is obtained by the image data processor circuit 163, and has a capacity enough to store image data of fifty frames. A decorative data memory 172 previously stores decorative data, which is used to modify the shape and pattern of framing lines around the subject image variously.

The decorative data memory 172 may also store decorative data for merging cartoons, marks, letters, messages and the like into a part of the subject image. In the display mode, selected data pieces are transferred from the flash memory 171 and the decorative data memory 172 to the image data processor circuit 163, and an image composed of the image data and the decorative data read from the flash memory 171 and the decorative data memory 172 is displayed on the LCD panel 121.

The head driver 139 drives the light emitting element array 141 of the printing head 138 under the control of the system controller 152. The image data is sent from line memories 174 of the three colors to the printing head 138, and is used for controlling the lighting times of the respective LEDs 143 to 145 of the light emitting element array 141. EEPROM 175 previously stores various kinds of adjustment data, which are referred to by the system controller 152 when the electronic still camera is operated according to a predetermined sequence.

The adjustment data is fine-adjusted to each individual camera in an inspection process after the finish of assembly of the electronic still camera. The adjustment data includes data related respective compensation data for the three colors adapted to printing. A motor driver 176 drives the developing motor 136 under the control of the system controller 152.

Figure 28:
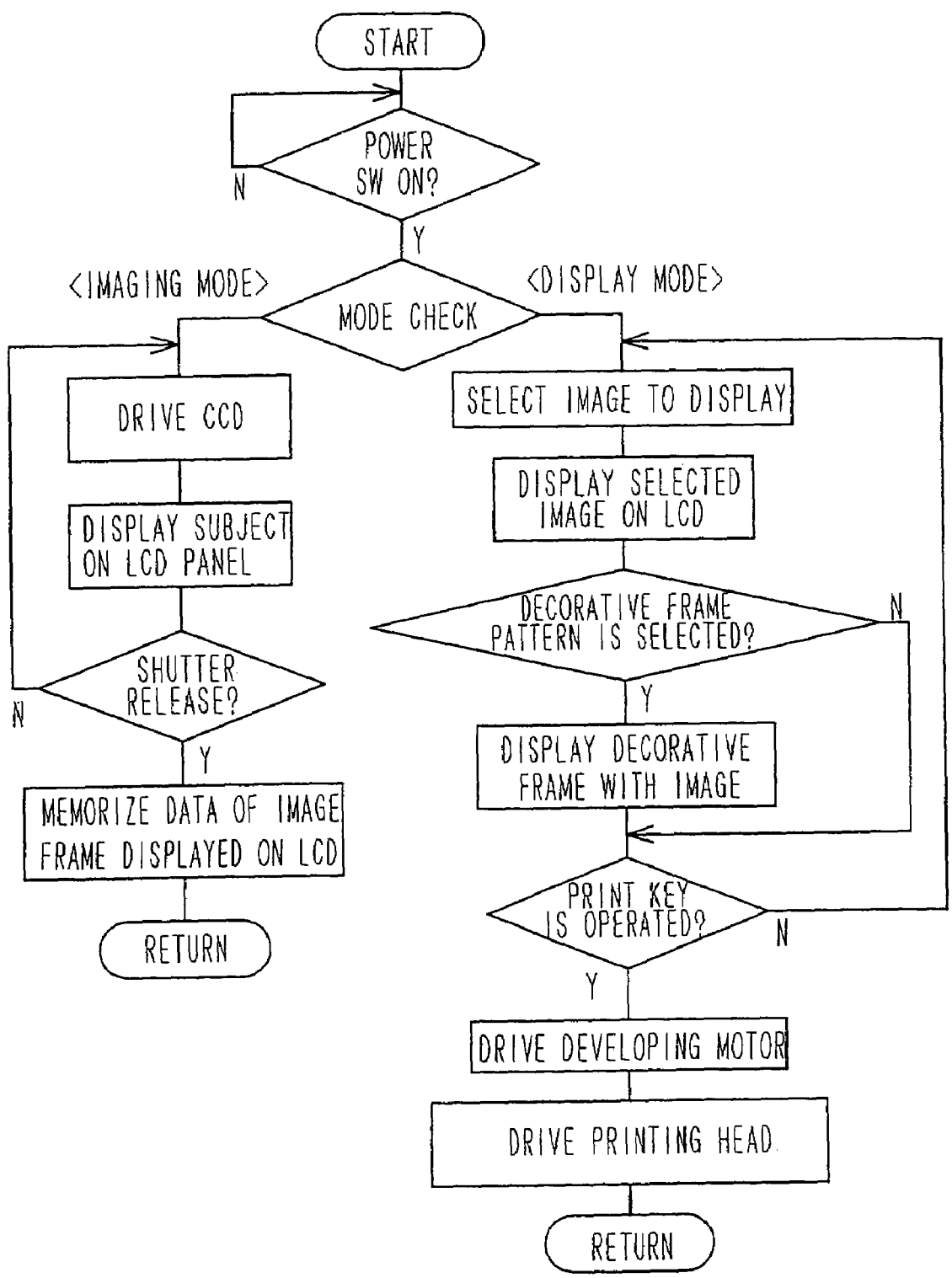
FIG. 28 is a flow chart illustrating the overall operation of the electronic still camera shown in FIG. 20.

The operation of the electronic still camera having the above-described construction will be described with reference to FIG. 28. When a power switch, which is provided on the control panel 122, is turned on, the system controller 152 determines the presently selected mode by a set position of the mode changer key in the control panel 122, and proceeds to either one of the image pick-up mode and the display mode. In the image pick-up mode, the CCD image sensor 155 picks up the subject image in a continuous manner, so the subject image is displayed as a moving image on the LCD panel 121 serving as the electronic viewfinder.

When the shutter release button 6 is pressed, the image data of the subject image displayed at that moment on the LCD panel 121 is written as a still image frame to the flash memory 171. By repeating the shutter release operation in the image pick-up mode, it is possible to write image data of at most fifty still image frames to the flash memory 171. The maximum number of frames the flash memory 171 can store varies depending upon the capacity of the flash memory 171.

After the image data of the maximum number of frames is written in the flash memory 171, it is possible to delete image data of unnecessary frames from the flash memory 171 and write newly obtained image data to the flash memory 171. These operations are effected by keying the control panel 122. It is also possible to store newly obtained image data in an external memory medium or transfer the image data from the flash memory 171 to the external memory medium by connecting the external memory medium to an output terminal of the external terminals 170.

In the display mode, a desired frame is designated by keying through the control panel 122. The image data of the designated frame is sent from the flash memory 171 to the image data processor circuit 163, converted by the D/A converter 164, amplified by the amplifier 165 and supplied to the LCD driver 167, which causes the LCD panel 121 to display an image of the designated frame. If a decorative frame pattern is designated by keying through the control panel 122, the decorative frame pattern data is transferred from the decorative data memory 172 to the image data processor circuit 163 in addition to the image data read transferred from the flash memory 171. Then, the LCD panel 121 displays a composed image of the subject image with the decorative frame image.

When the print key is operated after selecting the subject image and, if necessary, a decorative frame pattern, the system controller 152 accesses the flash memory 171, to sequentially read out image data pieces representative of three color densities of a first line from among the image data of the subject image presently displayed on the LCD panel 121, and are transferred to the line memories 174.

Also the developing motor 136 is driven to rotate by the motor driver 176. Upon rotation of the developing motor 136, the advance claw pushes out the exposed instant films 128 and, at the same time, the developing rollers 133 are caused to rotate. As the instant film 128 is pushed by the advance claw, the top edge of the instant film 128 comes in between the developing rollers 133. Thereafter, the developing rollers 133 rotate to advance the instant film 128 and, at the same time, break the solution pod 30a to spread the processing solution. The advance claw makes one stroke of reciprocation, and then stops at its home position.

The light emitting element array 141 is driven synchronously with the film advancing. The speed sensor 150 detects the advancing speed of the instant film 128. The speed compensation calculator 151 produces data for controlling lighting timing of the LEDs 143 to 145 depending upon the advancing speed, and sends the data to the head driver 139. The head driver 139 drives the LEDs 143 to 145 at corrected lighting timing. Three color pixels of the following lines are recorded on the instant film 128 in the same way as the first line in synchronism with the film advancing through the developing rollers 133, so that a full-color image frame is optically recorded at one advancing operation of the instant film 128.

The instant film 128 fed by the developing rollers 133 is ejected through the film exit 135 of the camera body 111. In one or a couple of minutes, the subject image is fixed as a positive image on the image receiving sheet, providing a hard copy of the subject image displayed on the LCD panel 121 at the time of operating the print key. If a decorative frame pattern is designated, the subject image as printed is surrounded with the decorative frame pattern.

Figure 29:
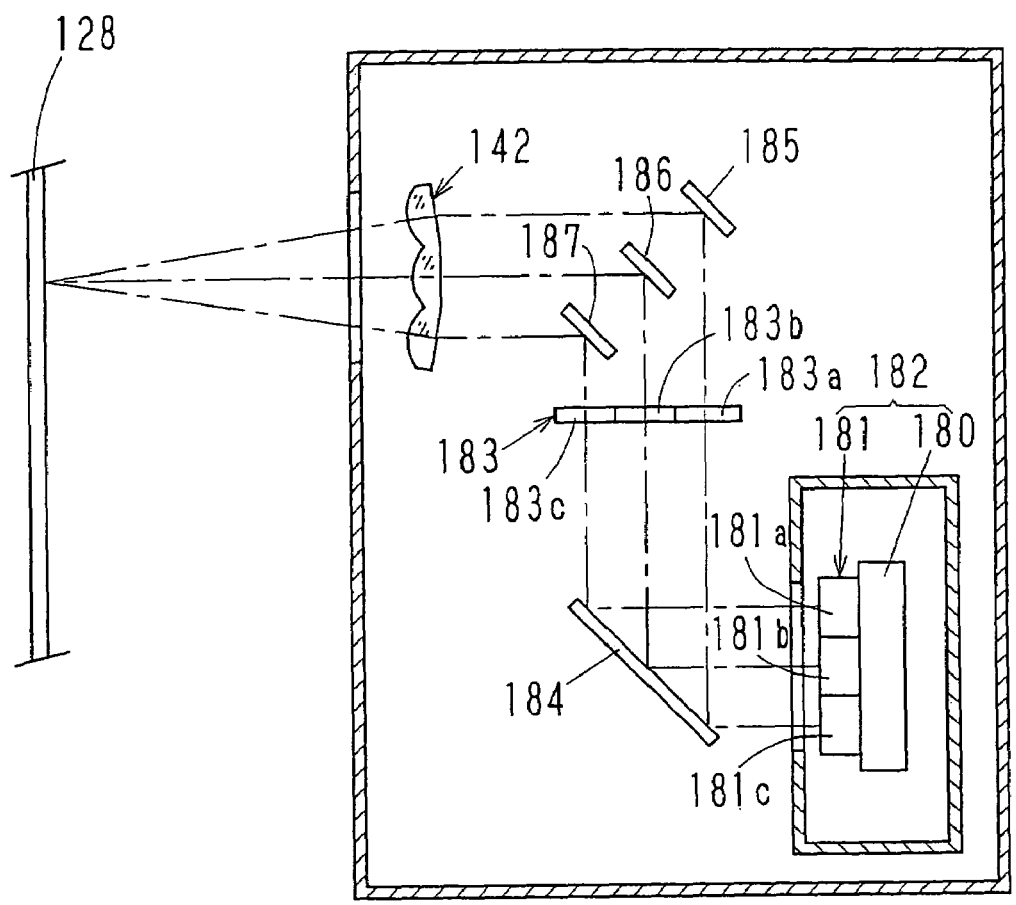
FIG. 29 is a vertical sectional view illustrating another embodiment of printing head.

As an alternative of the light emitting element array 141 consisting of the LEDs 143 to 145 arranged in the main scan direction, a light emitting element array 182 consisting of a white light emission panel 180 and an LCD array 181 is usable, as shown in FIG. 29. The LCD array 181 is constituted of three rows of LCD segments 181a, 181b and 181c for the three colors, whose transmittance and opening time are controlled to control the exposure amount of each pixel. In this embodiment, a color filter 183 is placed in respective light paths from the light emitting element array 182, to obtain red printing light beams through a red pass filter portion 183a of the color filter 183, green printing light beams through a green pass filter portion 183b, and blue printing light beams through a blue pass filter portion 183c. The three color light beams are focused through a micro lens array 142 onto the instant film 128 in the form of a line.

Mirrors 184, 185, 186 and 187 are used in the embodiment of FIG. 29, but they may be omitted in the same way as the embodiment of FIG. 25. The white light emission panel 180 may be replaced with a white fluorescent lamp or another white light source. As a light emitting element array, it is also possible to use such a light source that contains three colors and whose light amount is controllable, e.g. a fluorescent light source array consisting of micro light emitting elements which emit light based on the light emission principle of the fluorescent display tube.

In the above embodiments, the micro lenses 142a to 142c of the micro lens array 142 are inclined such that the three color light beams are focused into a line. It is alternatively possible to focus the three color printing light beams as three lines at a time on the photosensitive surface through a micro lens array 190 where micro lenses 190a, 190b and 190c for the three colors are arranged in the same plane, as shown in FIGS. 30 and 31.

Figure 30:
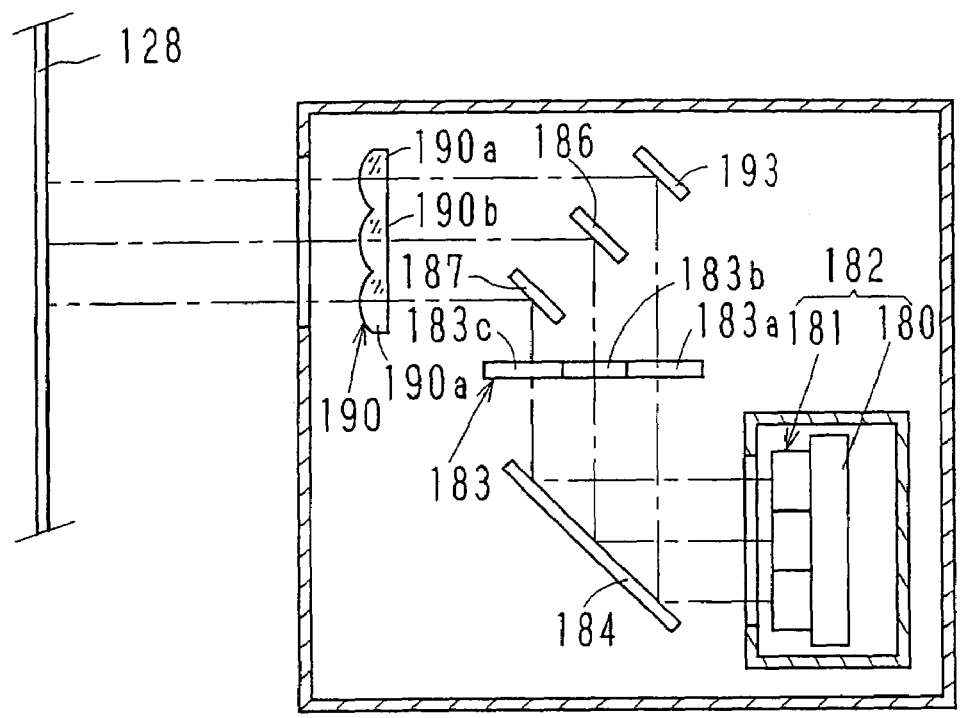
FIG. 30 is a vertical sectional view illustrating a further embodiment of printing head.
Figure 31:
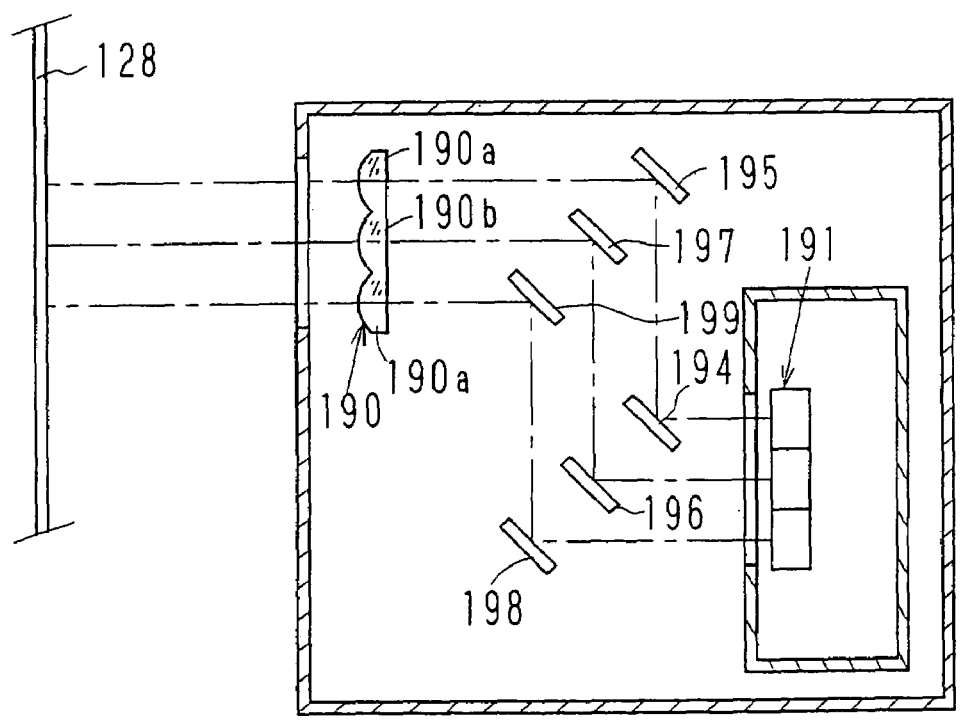
FIG. 31 is a vertical sectional view illustrating still another embodiment of printing head.

FIG. 30 shows an embodiment using a light emitting element array 182 with a white light emission panel 180 and a color filter 183 for converting the white light into the three color printing light beams, like the embodiment of FIG. 29. FIG. 31 shows an embodiment where a three color light emitting element array 191 is constituted of LEDs, or combinations of light emitting elements and LCD segments. In these embodiments, the image data of the respective lines to record is sent to the light emitting element array, for recording a full-color image without a color registration failure. In FIG. 31, designated by 194, 195, 196, 197, 198 and 199 are mirrors.

The amount of exposure per pixel may be controlled by changing the intensity of light from the light emitting elements, instead of or in addition to changing their lighting times. To those light emitting elements which directly emit light, e.g. LEDs, the light intensity is controlled by controlling electric power supply. Where the light emitting element array uses LCD segments, the light intensity is controlled by controlling transmittance of the LCD segments.

Figure 32:
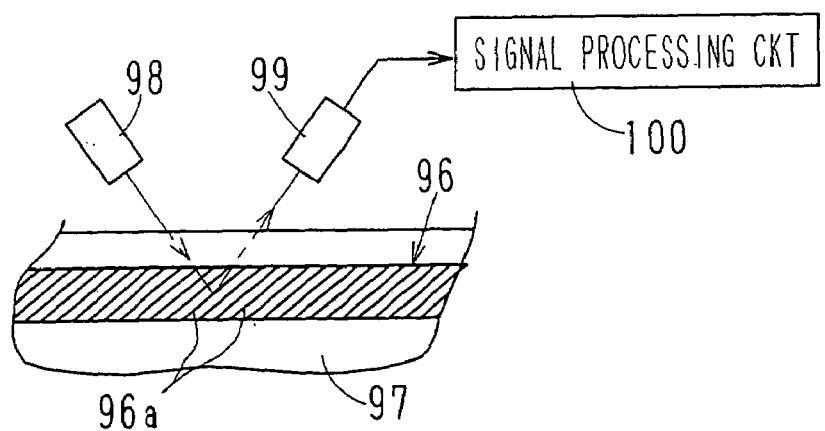
FIG. 32 is an explanatory diagram illustrating essential parts of an embodiment wherein the film advancing speed is detected by use of an instant film that is provided with an advancing speed detection track.

In the above embodiment, the film advancing or ejecting speed is detected by means of a driven roller that is in contact with and rotates along with the advancing instant film 128, the speed fluctuation may be detected by any other speed detection method. In an example as shown in FIG. 32, a speed detection track 96 with a large number of bars 96a spaced at a very small interval in the film advancing direction is provided on an instant film 97. The film advancing speed is determined based on detection timings of the bars 96a. In that case, the bars 96a are detected by use of an infrared light projector 98 and an infrared light receptor 99, so that the photosensitive surface may not be exposed. On the basis of the detection timing of the bars 96a, a signal processing circuit 100 determines the film advancing speed.

The speed detection track 96 may be provided with other marks than the bars 96a. It is also possible to form a magnetic recording layer on the instant film, and previously record magnetic marks on the magnetic recording layer, so that a magnetic head reads the magnetic marks to detect the film advancing speed.

As described so far, the multi-color emission type printing head is used, and the film advancing operation through the developing rollers for developing processing solution is utilized for the sub scanning, so that the printing head does not need to move in the sub scan direction, and thus the construction is simplified. Since the light emission timing is controlled in accordance with fluctuations in the advancing speed of the instant film, digital printing is achieved while reducing unexpected density variations and color failures due to the speed fluctuation, even through the advancing speed trends to fluctuate while the processing solution is being developed. By using the instant film with the speed detection track having marks arranged at regular intervals along the film advancing direction, the fluctuation in the film advancing speed can be detected based on the speed detection track by use of a simple device.

In the above embodiment, a full-color image is recorded while the instant film 128 is ejected by use of the advance claw and the developing rollers 133. However, image recording may be done only while the instant film 128 is ejected through the developing rollers 133, not while it is ejected by the advance claw. In that case, the printing head starts being driven to record a full-color image, after the instant film comes in between the developing rollers 133. The print head unit is located in proximity to the developing rollers 133 insofar as it is affected by the developed processing solution.

In the above embodiment, the instant printer of the present invention is incorporated into the electronic still camera. The instant printer of the present invention may also be embodied as a separate printer. Also in that case, three color recording is performed effectively. The instant printer of the invention may be a device attachable to an electronic still camera. In addition, it is possible to incorporate the instant printer of the present invention into a digital video camera that records a moving picture. In that case, a frame of the moving picture is selected as a still image to print.

Figure 33:
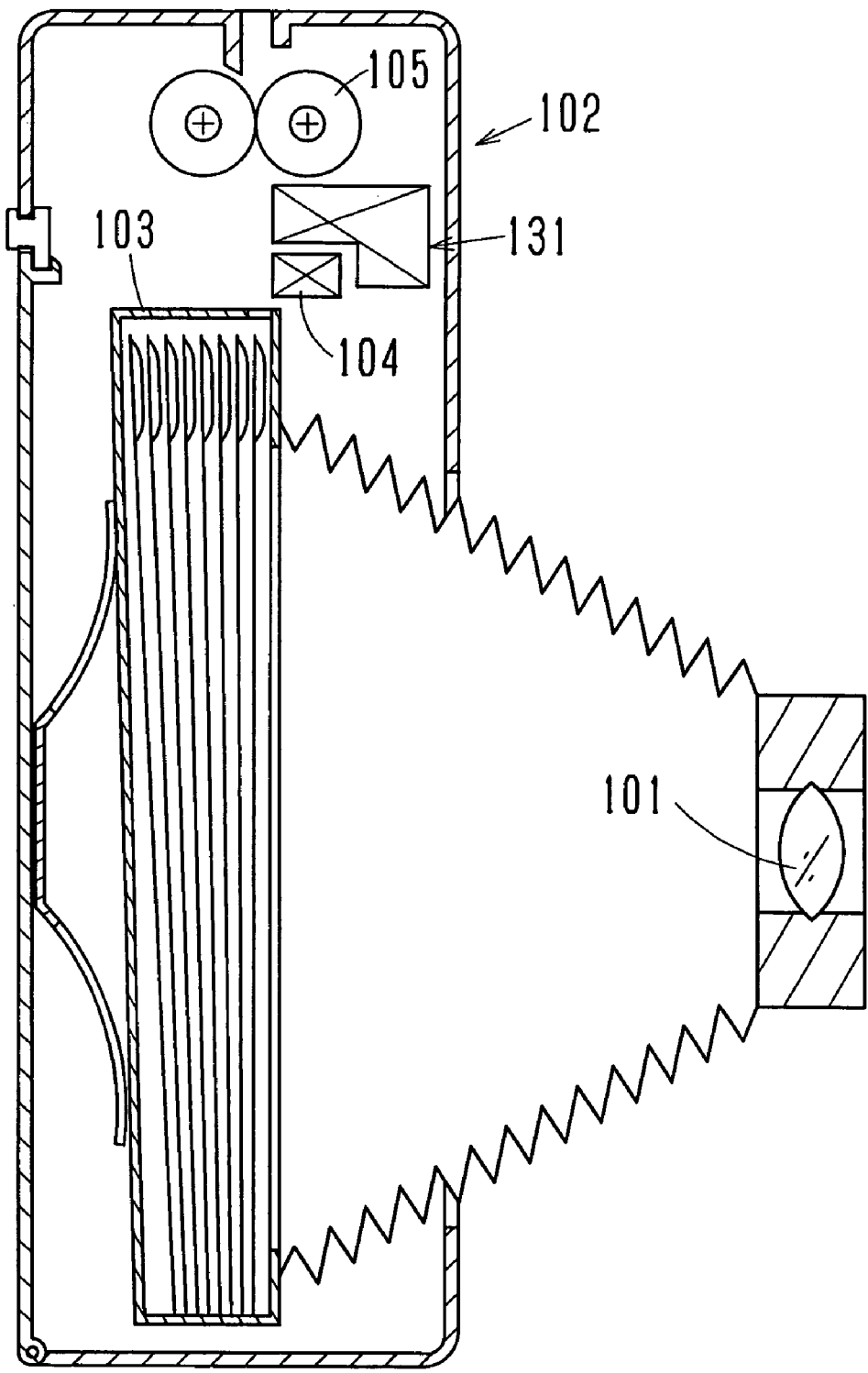
FIG. 33 is a schematic vertical sectional view of an embodiment wherein an instant printer of the invention is mounted in an instant camera.

Furthermore, as shown in FIG. 33, it is possible to mount the printer head unit 131 in an instant camera 102 having a taking lens 101 for exposing an instant film frame by frame, in a position between a film pack 103 and developing rollers 104. In this embodiment, an external input terminal is provided for entering image data, and an image is printed digitally on an instant film based on the image data, while the instant film is advanced to the outside, in the same way as the above described embodiment. It is desirable to provide the instant camera 102 with a speed sensor 104 for detecting the film advancing speed and thus controlling timing of light emission in accordance with variations in the film advancing speed. In this way, the instant camera 102 can take a photograph by frame-exposure, and also make a print digitally based on image data picked up through other electronic camera or the like. It is also possible to provide the instant camera 102 with an imaging section consisting of an image sensor for picking up image signals and a memory for storing image data obtained from the image signal.

It is, of course, possible to mount a multi-color projection type printing head as above instead of the printing head 32 in the electronic still camera as shown in FIG. 1 or FIG. 8.

In that case, a full-color image is printed on the instant film while moving the multi-color projection type printing head in the sub scanning direction only once, and the exposed instant film is thereafter advanced out of the camera through the developing rollers.

Thus, the present invention is not to be limited to the above described embodiments, but various modification will be possible without departing from the scope of appended claims.

INDUSTRIAL APPLICATION FIELD

The present invention may be embodied as an electronic still camera having a printer incorporated thereinto, and as a separate instant printer as well. It is also possible to mount an instant printer of the present invention to an electronic still camera in a removable fashion. In addition, the present invention is applicable in a digital video printer recording a moving image or in an instant camera of frame-exposure type.

What is claimed is:

1. An electronic still camera comprising an imaging device for obtaining electronic image data from an optical image of a subject, memory means for recording said image data therein, and a printing device for printing an image on an instant film containing a processing solution therein, said printing device comprising:
   a printing head which is elongated in a main scan direction;
   a head moving mechanism for moving said printing head in a sub scan direction perpendicular to the main scan direction;
   a power source battery electrically connected so as to provide power to the head moving mechanism;
   a head driver for driving said printing head on the basis of one frame of image data read out from said memory means in a line sequential fashion while said printing head is moved in the sub scan direction, to expose said instant film line by line while said instant film stands still; and
   developing rollers for advancing said instant film after exposure out of a camera body while developing said processing solution inside said exposed instant film;
   wherein the printing head, the head moving mechanism, the head driver, the developing rollers, and the power source battery are all disposed in the body of the camera.

2. An electronic still camera according to claim 1, further comprising:
   a memory storing predetermined image data;
   a device for reading out appropriate image data from said memory and composing said appropriate image data with said image data of a subject image; and
   a display device for displaying said subject image or a composite image on the basis of said subject image data or said composed image data respectively, wherein said printing device may print said composite image on the basis of said composed image data.

3. An electronic still camera according to claim 1, further comprising a film exit formed through a top face of said camera body, through which said exposed instant film is advanced out in a direction parallel to the sub scan direction.

4. An electronic still camera according to claim 1, further comprising external terminals for communicating image data with external apparatuses, including printers, computers and memories.

5. An electronic still camera according to claim 1, wherein said printing head sequentially emits red, green and blue light beams such that a full-color image is printed in a three color frame sequential fashion.

6. An electronic still camera according to claim 1, wherein said printing head simultaneously emits red, green and blue light beams such that a full-color image is printed while said printing head makes a single movement in the sub scan direction.

7. An electronic still camera according to claim 5, wherein said printing head comprises a fluorescent lamp, a red pass filter, a green-pass filter, a blue pass filter, a filter switching device for positioning one of said three filters in a light path of said fluorescent lamp, an LCD array arranged in a row in the light path of said fluorescent lamp, and an optical system for projecting light from said fluorescent lamp onto said instant film.

8. An electronic still camera according to claim 5, wherein said printing head comprises a fluorescent light source array consisting of a plurality of fluorescent light sources arranged in a row in correspondence with respective pixels, a red pass filter, a green pass filter, a blue pass filter, a filter switching device for positioning one of said three filters in a light path of said fluorescent light source array, and an optical system for projecting light from said fluorescent light source onto said instant film.

9. An electronic still camera according to claim 1, wherein said electronic still camera may be repeatedly loaded with an instant film pack containing a plurality of said instant films.

10. An electronic still camera comprising:
an imaging and recording device for displaying a moving image of a subject on a display panel based on an image signal picked up through an image sensor in a real time fashion, obtaining digital image data from said image signal and recording said image data frame by frame in memory means in response to a shutter release signal;
a display device for displaying a still image on said display panel on the basis of image data read out from said memory means;
a printing device for printing an image on a photosensitive recording medium by driving a printing head on the basis of image data read out from said memory means, said printing device comprising:
a printing head which is elongated in a main scan direction;
a head moving mechanism for moving said printing head in a sub scan direction perpendicular to the main scan direction;
a power source battery electrically connected so as to provide power to the head moving mechanism;
a head driver for driving said printing head on the basis of one frame of image data read out from said memory means in a line sequential fashion while said printing head is moved in the sub scan direction, to expose said instant film line by line while said instant film stands still; and
developing rollers for advancing said instant film after exposure out of a camera body while developing said processing solution inside said exposed instant film;
wherein the printing head, the head moving mechanism, the head driver, the developing rollers, and the power source battery are all disposed in a body of the camera; and
a mode selection device for selecting and switching one of said imaging and recording device, said display device and said printing device to an active condition, wherein said mode selection device automatically sets an imaging mode, immediately after a power switch is turned on, where said imaging and recording device is active, and said mode selection device, immediately after a print mode is selected, terminates said imaging mode, or a display mode where said display device is active, and makes said printing device ready and causes said display panel to display a still image on the basis of image data recorded last in said memory means, and said printing device prints the image that is displayed on the display panel in response to a print execution signal.

11. An electronic still camera according to claim 10, wherein said display panel stops displaying any image upon said print execution signal, and all signals input through external operation are canceled until said printing device completes making at least one sheet of print.

12. An electronic still camera according to claim 10, wherein said photosensitive recording medium is an instant film containing a processing solution therein, and said electronic still camera further comprises developing rollers for advancing said instant film out of a camera body while developing said processing solution in said instant film as an image is recorded on said instant film by said printing device.

13. An electronic still camera according to claim 11, wherein said photosensitive recording medium is an instant film containing a processing solution therein, and said electronic still camera further comprises developing rollers for advancing said instant film out of a camera body while developing said processing solution in said instant film as an image is recorded on said instant film by said printing device.

14. An electronic still camera comprising a pack loading chamber for loading a film pack containing a plurality of self-developing type instant films each having a pod containing a processing solution, an image sensor for photographing a subject image and outputting an image signal, a memory for storing image data obtained from said image signal through digital conversion, a printing head for exposing said instant film on the basis of image data of one frame read out from said memory, a head moving mechanism for moving said printing head along an exposure surface of said instant film, a claw that engages with an edge of said instant film after exposure, and pushes said instant film toward an exit that is formed through a camera body, developing rollers disposed near said exit to nip said instant film as pushed by said claw and advance said instant film out of said exit, thereby to crush open said pod to develop said processing solution inside said instant film, a developing and driving mechanism for driving said claw and said developing rollers, and a power source battery for supplying power to said image sensor, said head moving mechanism and said developing and driving mechanism,
said electronic still camera is characterized in that said head moving mechanism and said developing and driving mechanism are located on opposite sides of said pack loading chamber.

15. An electronic still camera according to claim 14, wherein said image sensor and said power source battery are located outside said head moving mechanism or said developing and driving mechanism.

16. An electronic still camera according to claim 15, wherein a chamber for loading said instant film is provided in the front side of said camera body.

17. An electronic still camera comprising:
- a taking lens mounted on a front side of a box-shaped camera body;
- an image sensor for photographing a subject image through said taking lens and outputting an image signal;
- a memory for storing image data obtained from said image signal through digital conversion;
- an optical printer for exposing an instant film containing a processing solution therein in accordance with image data of one frame read out from said memory;
- a developing and driving device including developing rollers for developing said processing solution while advancing said instant film after exposure out of said camera body; and
- an operating section mounted on a back side of said camera body and operated for controlling said optical printer; and
- a pack loading door mounted on a front face of said camera body, the pack loading door being mounted so as to allow loading a film pack containing said instant film from a front side of said camera body.

18. An electronic still camera according to claim 17, wherein an LCD panel is provided on the back side of said camera body.

19. An electronic still camera according to claim 16, wherein an LCD panel is provided on the back side of said camera body.

* * * * *